Figure 2:
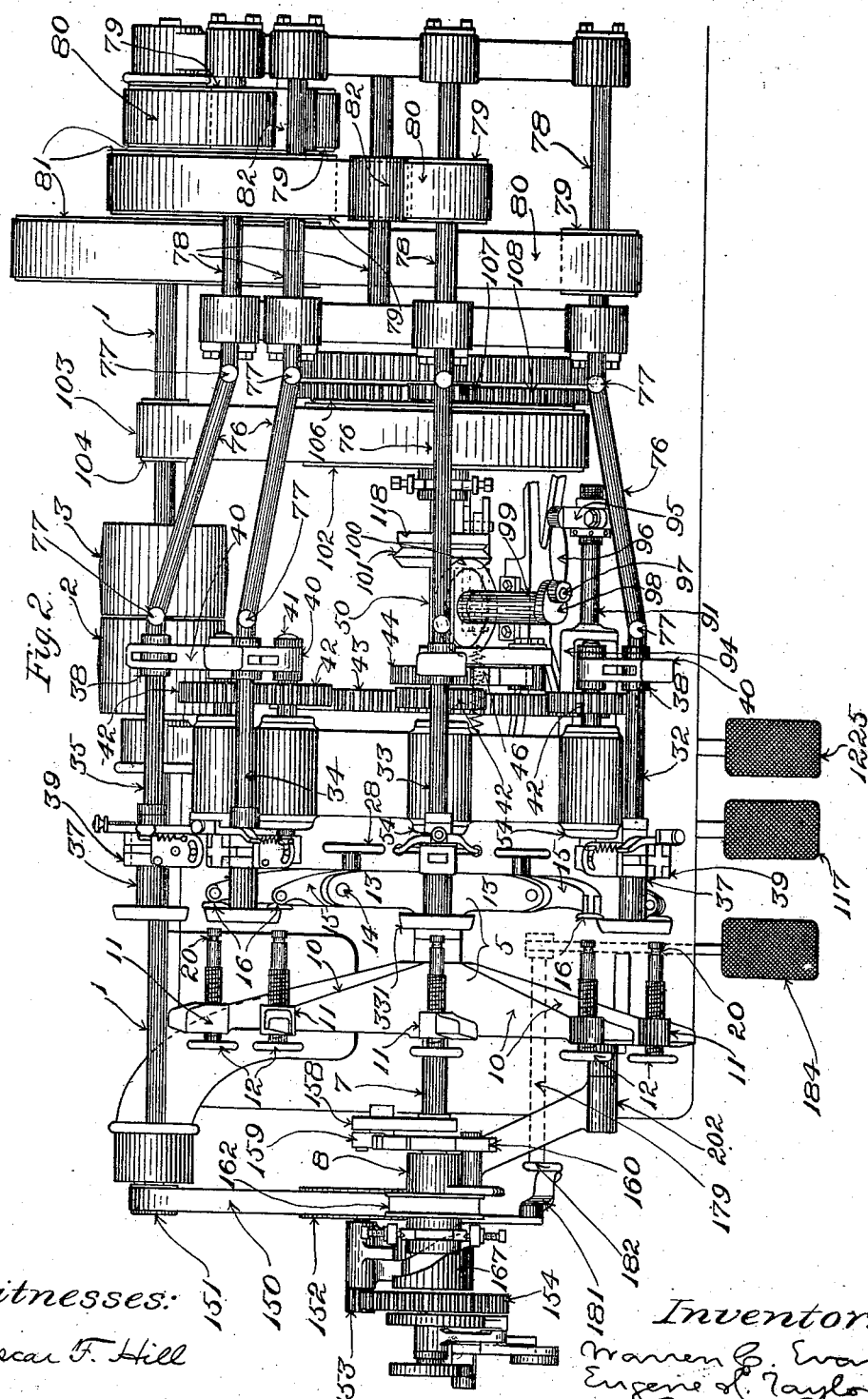

No. 896,285. PATENTED AUG. 18, 1908.
W. C. EVANS & E. H. TAYLOR.
MACHINE FOR FINISHING THE HEELS OF BOOTS AND SHOES.
APPLICATION FILED AUG. 9, 1902.
12 SHEETS—SHEET 3.
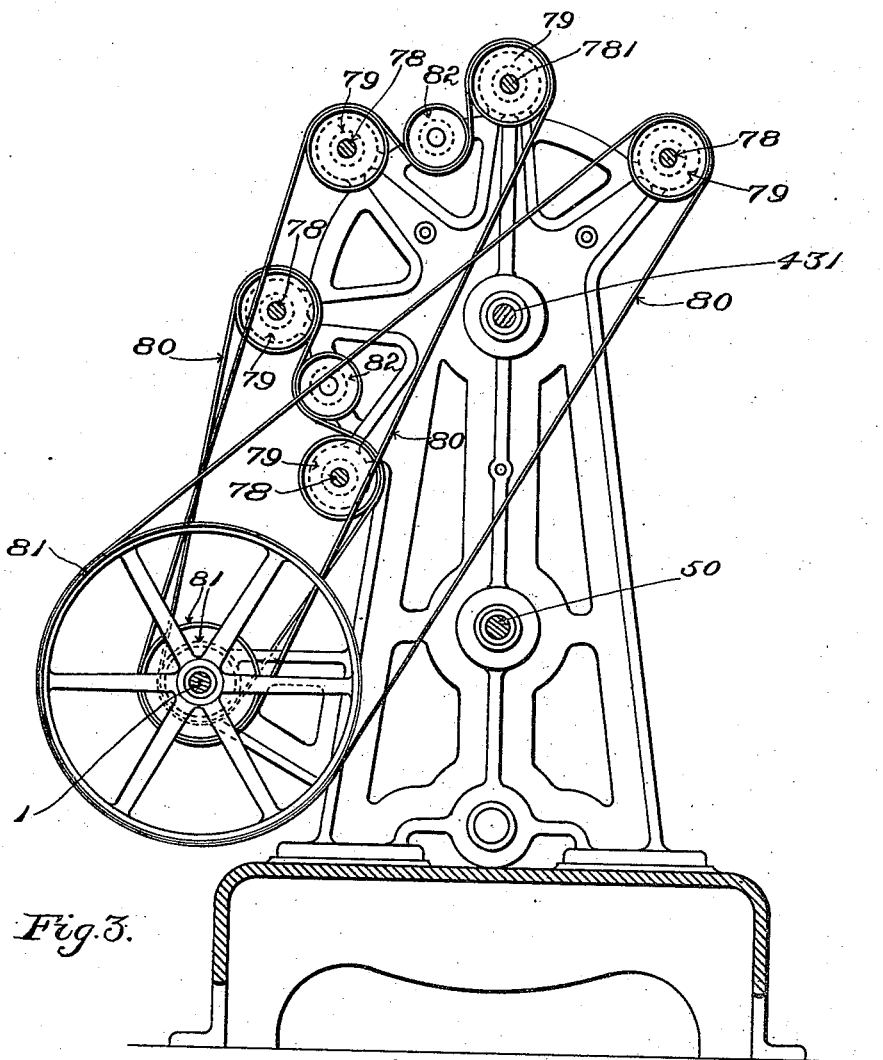
Fig. 3.
Fig. 2.ª
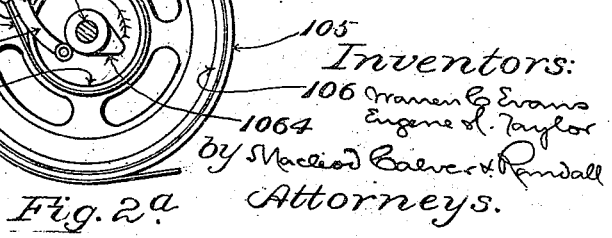
Witnesses:
Oscar F. Hill
Edith J. Anderson
Inventors:
Warren C. Evans
Eugene H. Taylor
by Macleod Calver & Randall
Attorneys.

No. 896,285. PATENTED AUG. 18, 1908.
W. C. EVANS & E. H. TAYLOR.
MACHINE FOR FINISHING THE HEELS OF BOOTS AND SHOES.
APPLICATION FILED AUG. 9, 1902.

12 SHEETS—SHEET 5.

Witnesses:
Oscar F. Hill
Edith J. Anderson

Inventors:
Warren C. Evans
Eugene H. Taylor
by Macleod Calver & Randall
Attorneys.

No. 896,285.
PATENTED AUG. 18, 1908.
W. C. EVANS & E. H. TAYLOR.
MACHINE FOR FINISHING THE HEELS OF BOOTS AND SHOES.
APPLICATION FILED AUG. 9, 1902.

12 SHEETS—SHEET 6.

Witnesses:
Oscar F. Hill
Edith J. Anderson

Inventors.
Warren C. Evans
Eugene H. Taylor
by Macleod Calver & Randall
Attorneys.

No. 896,285. PATENTED AUG. 18, 1908.
W. C. EVANS & E. H. TAYLOR.
MACHINE FOR FINISHING THE HEELS OF BOOTS AND SHOES.
APPLICATION FILED AUG. 9, 1902.

Witnesses:
Oscar F. Hill
Edith J. Anderson

Inventors:
Warren C. Evans
Eugene H. Taylor
by Macleod Calvert & Randall
Attorneys.

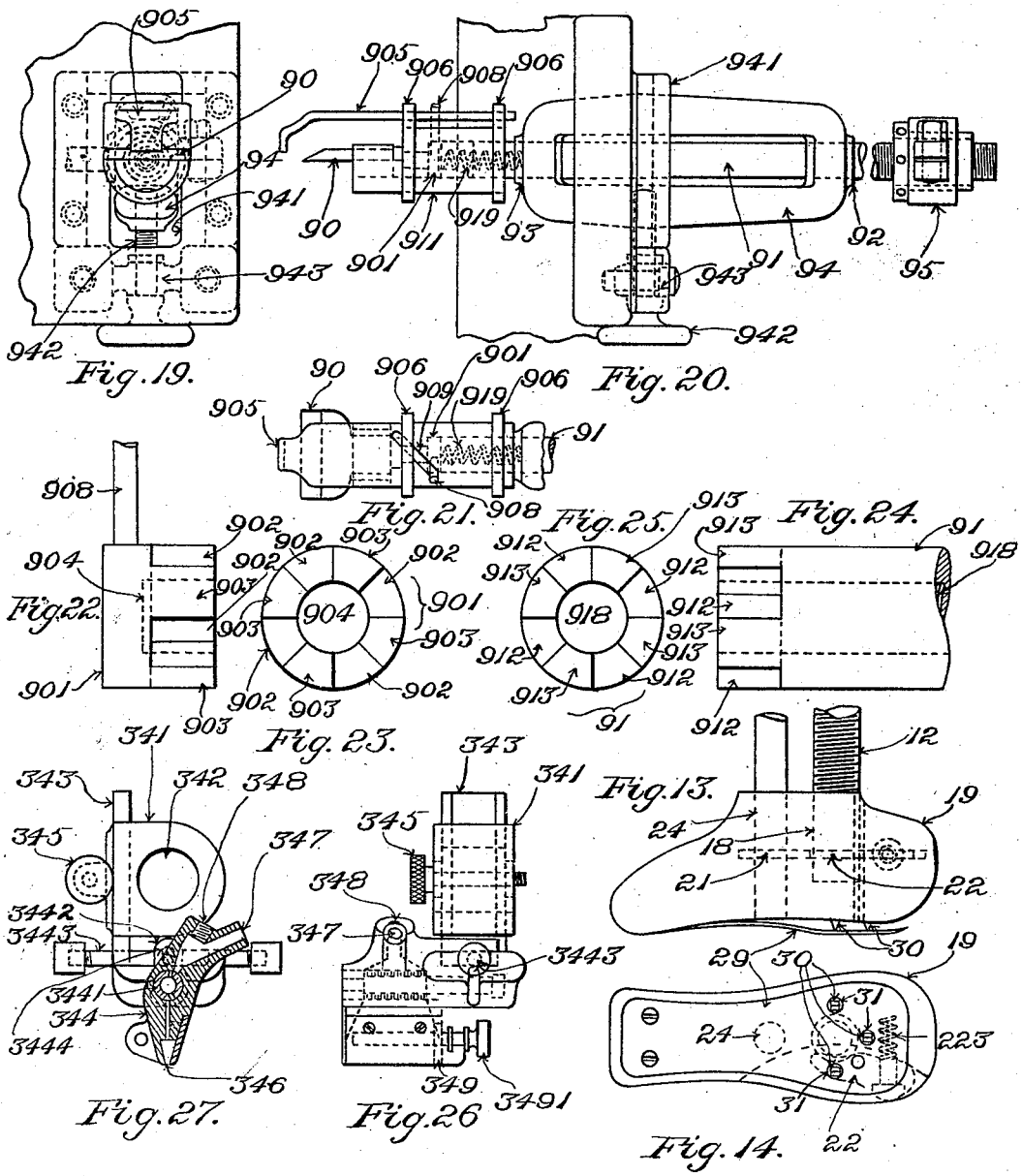

No. 896,285. PATENTED AUG. 18, 1908.
W. C. EVANS & E. H. TAYLOR.
MACHINE FOR FINISHING THE HEELS OF BOOTS AND SHOES.
APPLICATION FILED AUG. 9, 1902.
12 SHEETS—SHEET 11.
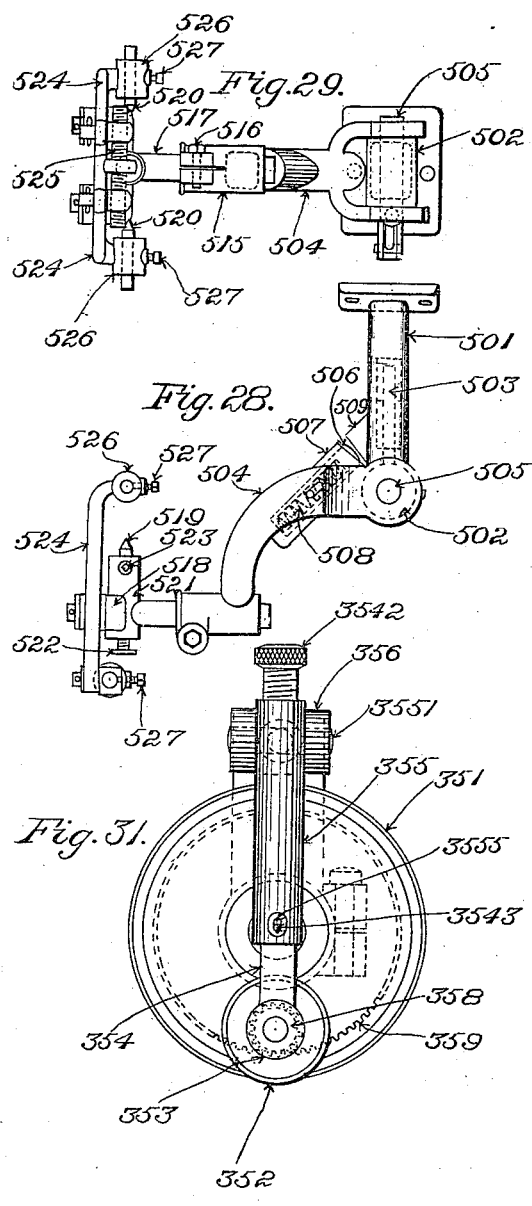
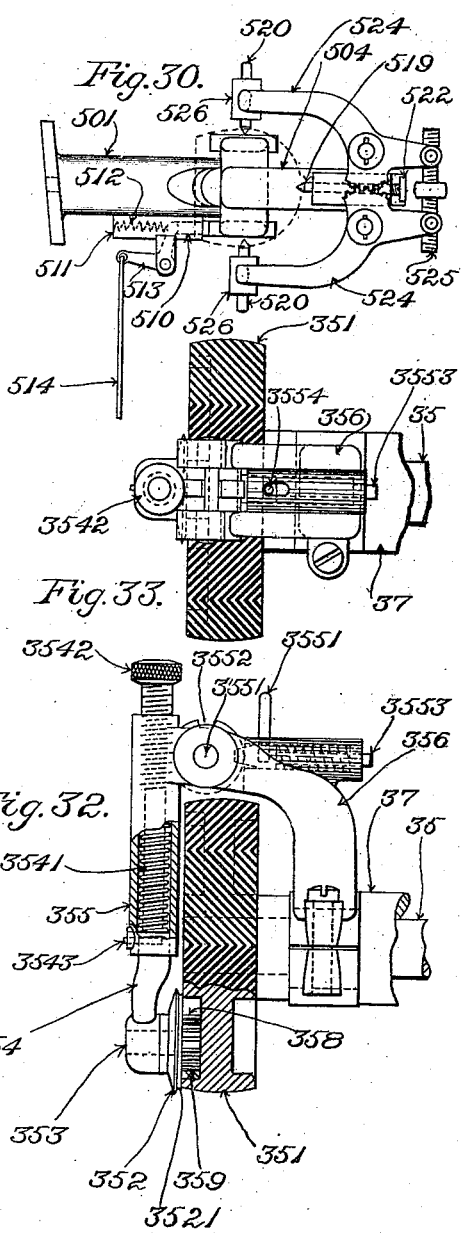
Witnesses:
Oscar F. Hill
Edith J. Anderson
Inventor
Warren C. Evans
Eugene H. Taylor
by MacLeod Calver & Randall
Attorneys.

No. 896,285. PATENTED AUG. 18, 1908.
W. C. EVANS & E. H. TAYLOR.
MACHINE FOR FINISHING THE HEELS OF BOOTS AND SHOES.
APPLICATION FILED AUG. 9, 1902.
12 SHEETS—SHEET 12.
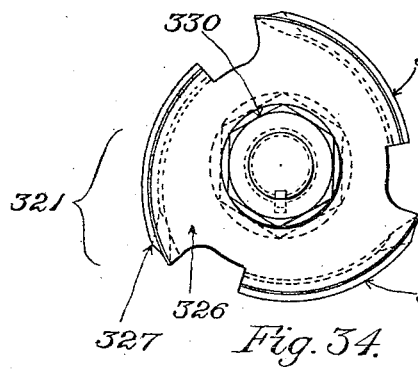
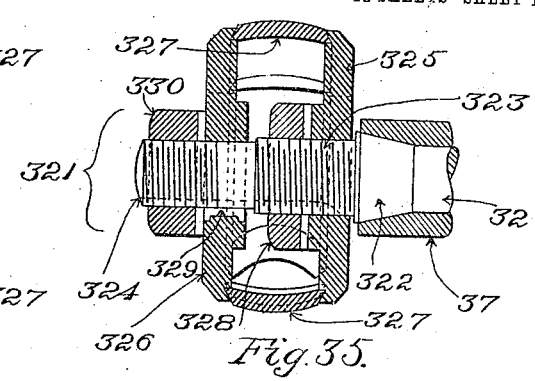
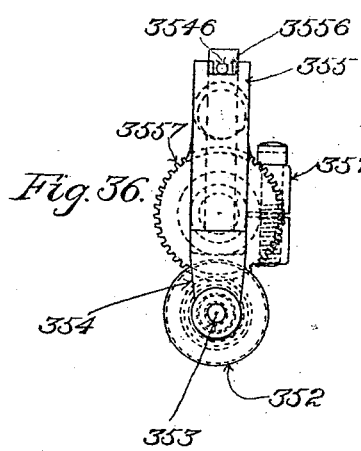
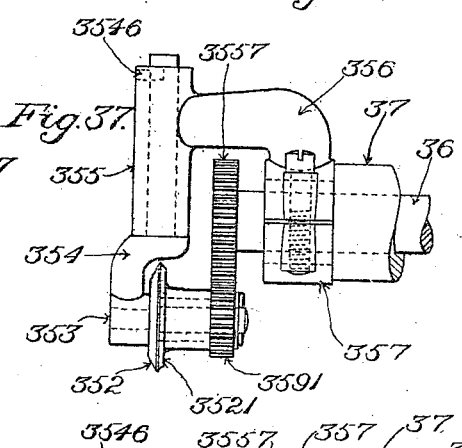
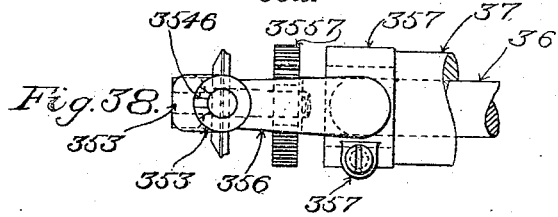
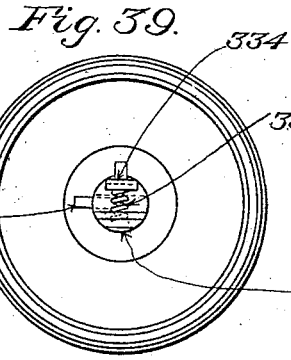
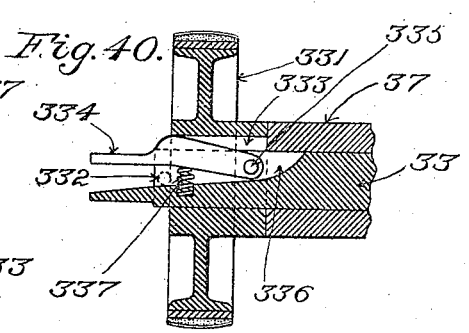
Witnesses:
Oscar F. Hill
Edith J. Anderson
Inventors:
Warren C. Evans
Eugene H. Taylor
by Macleod Calver & Randall
Attorneys.

UNITED STATES PATENT OFFICE.

WARREN C. EVANS, OF EXETER, NEW HAMPSHIRE, AND EUGENE H. TAYLOR, OF LYNN, MASSACHUSETTS, ASSIGNORS TO THE AUTOMATIC HEEL TRIMMING AND BURNISHING MACHINE COMPANY, OF EXETER, NEW HAMPSHIRE, A CORPORATION OF MAINE.

MACHINE FOR FINISHING THE HEELS OF BOOTS AND SHOES.

No. 896,285.    Specification of Letters Patent.    Patented Aug. 18, 1908.

Application filed August 9, 1902. Serial No. 119,065.

*To all whom it may concern:*

Be it known that we, WARREN C. EVANS and EUGENE H. TAYLOR, citizens of the United States, residing at Exeter, in the county of Rockingham, State of New Hampshire, and at Lynn, in the county of Essex and State of Massachusetts, (whose post-office addresses are 76 Front street, said Exeter, and 747 Washington street, said Lynn, respectively,) have invented a certain new and useful Improvement in Machines for Finishing the Heels of Boots and Shoes, of which the following is a specification, reference being had therein to the accompanying drawings.

Figure 1:
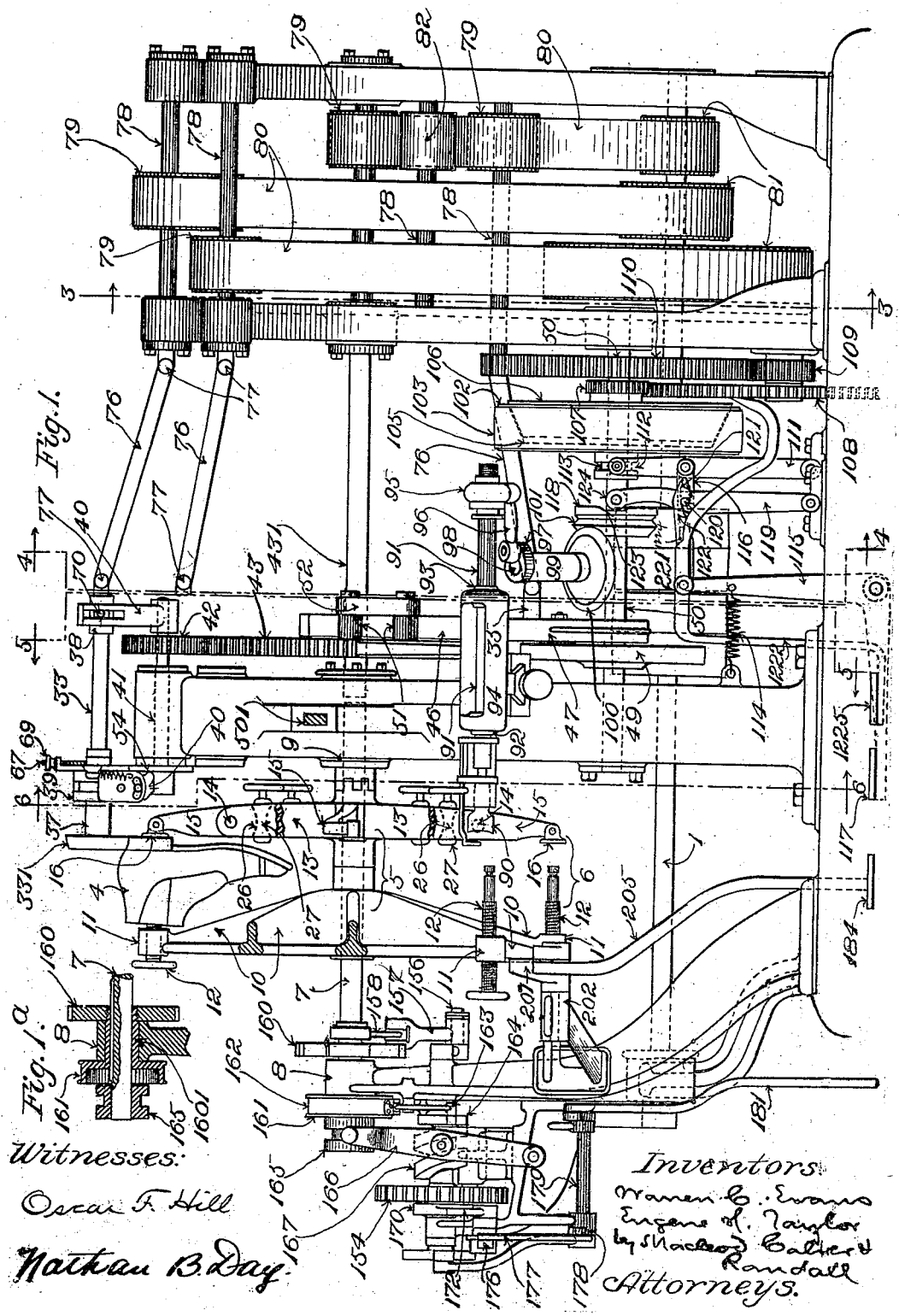
Figure 4:
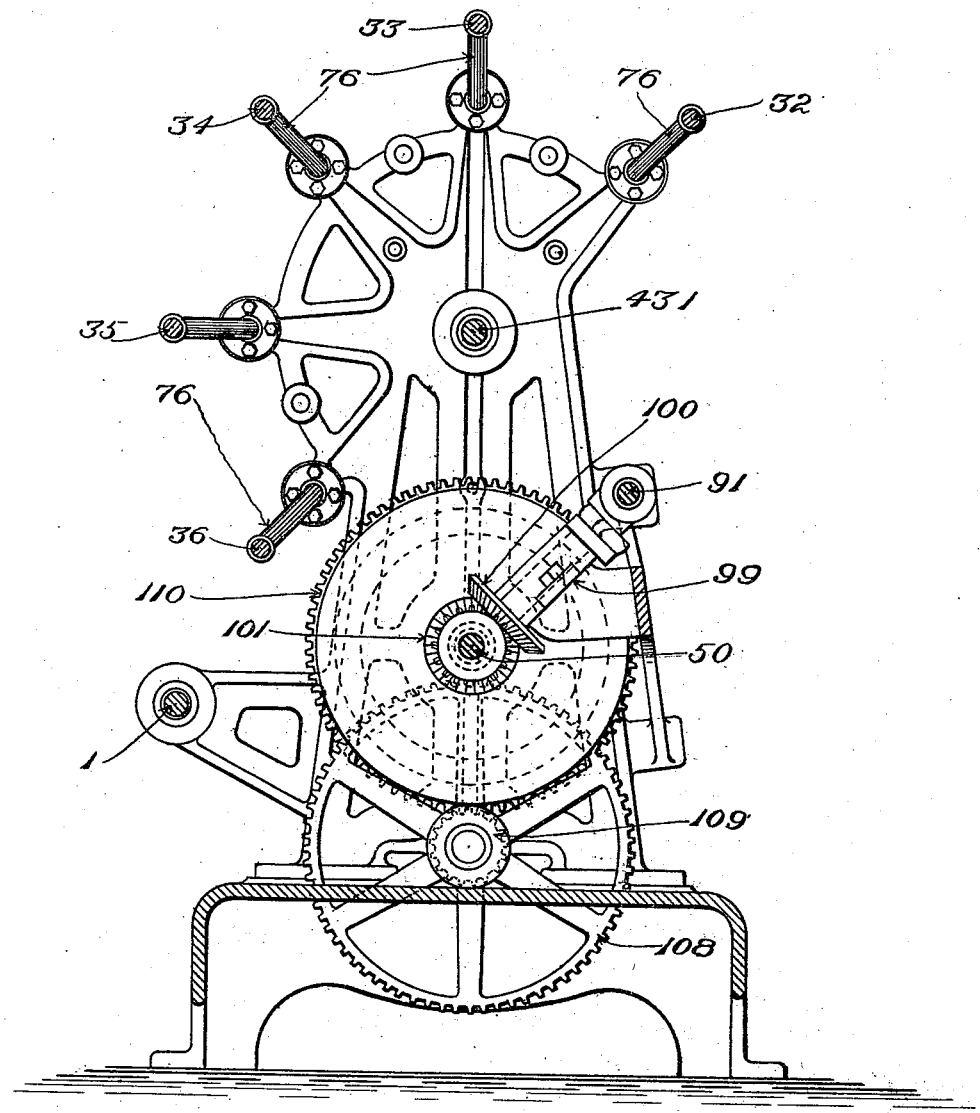
Figures 5, 17, 18:
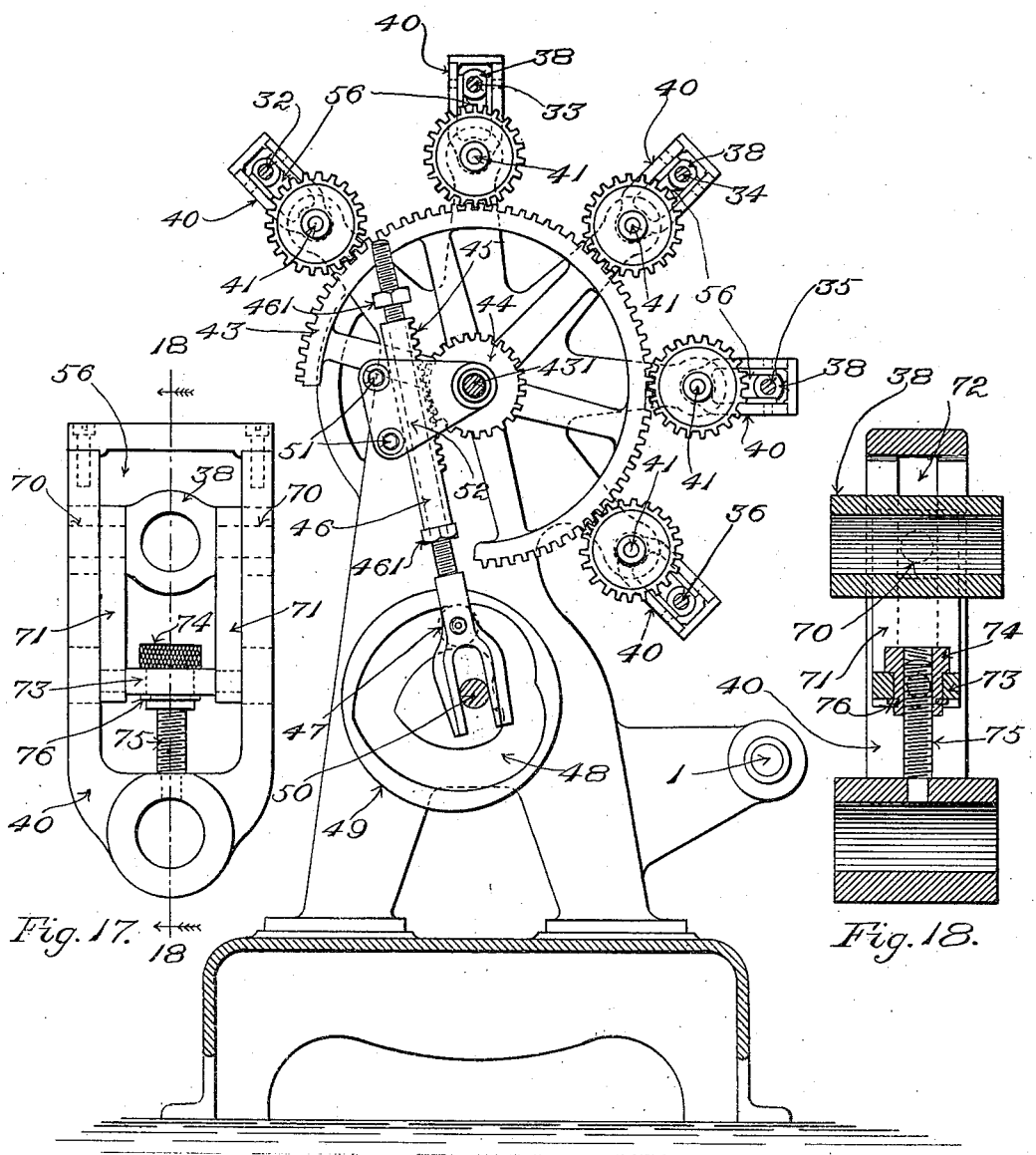
Figure 6:
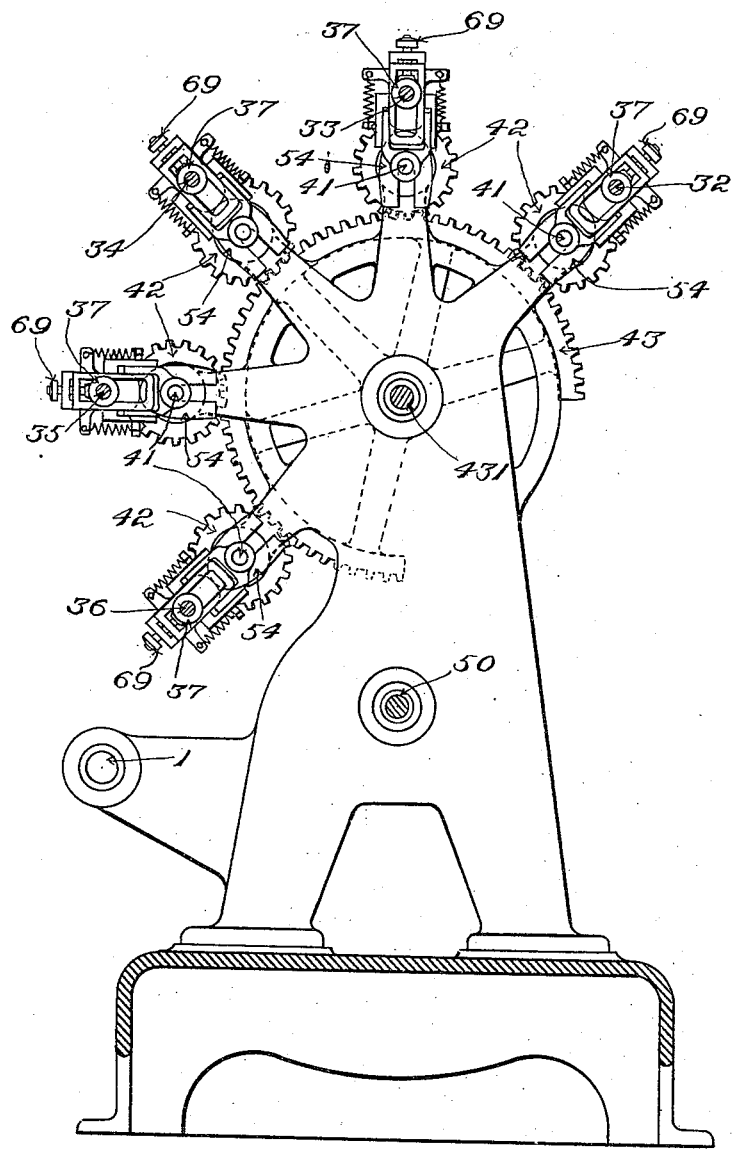
Figure 7:
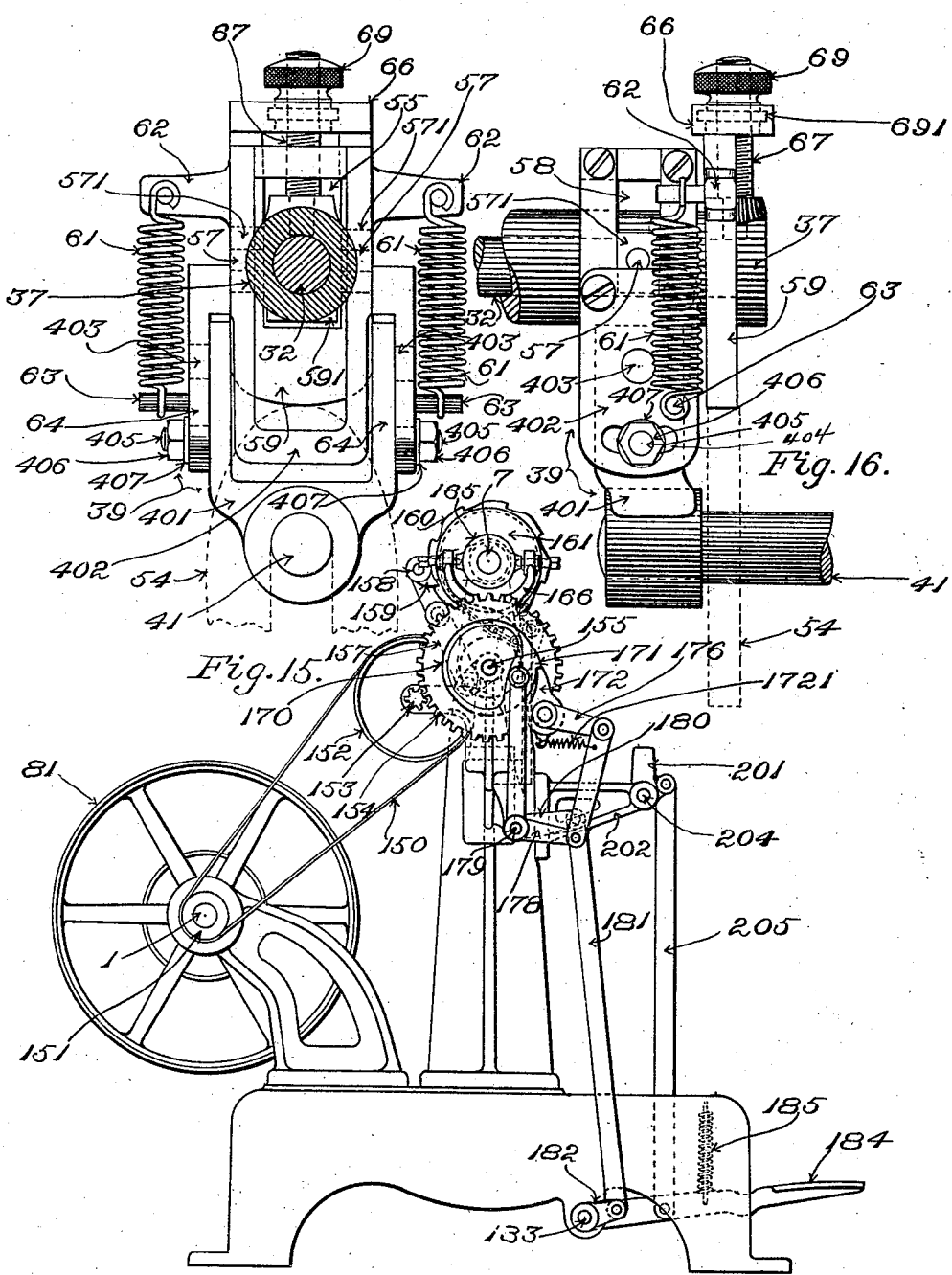
Figure 8:
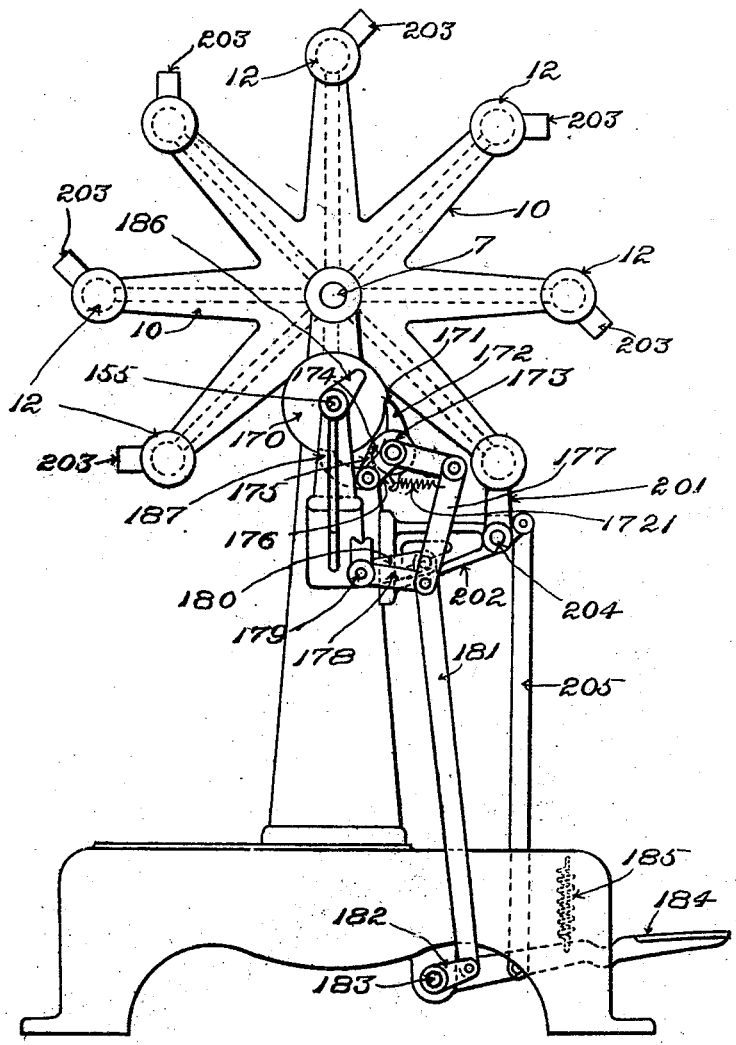

In the drawings,— Figure 1, Sheet 1, is a side elevation of a machine embodying the features of our present invention, and Fig. 1ª is a sectional detail of the operating connections of the work-carrier. Fig. 2, Sheet 2, is a plan of the said machine. Fig. 2ª, Sheet 3, is a sectional detail of the brake-devices which are employed in connection with the driving connections for the tool-carrier actuating devices. Fig. 3, Sheet 3, is a view in section on the vertical plane indicated by the dotted line 3 3 in Fig. 1, looking in the direction indicated by the arrows near the ends of the said line. Fig. 4, Sheet 4, is a view in section on the vertical plane indicated by the dotted line 4 4 Fig. 1, looking in the direction indicated by the arrows near the ends of the said line. Fig. 5, Sheet 5, is a view in section on the vertical plane indicated by the dotted line 5 5 in Fig. 1, looking in the direction indicated by the arrows near the ends of said line. Fig. 6, Sheet 6, is a view in vertical section along the dotted line 6 6 of Fig. 1, looking in the direction indicated by the arrows near the ends of the said line. Fig. 7, Sheet 7, is an end elevation taken at the left hand side of the machine in Fig. 1. Fig. 8, Sheet 8, is a somewhat similar elevation, omitting various parts and designed to show chiefly certain features of the stop-and-start mechanism for the work-carrier. Fig. 9, Sheet 9, is a plan view of the portion of the work carrier which is furnished with the lasts or forms to which the boots or shoes are applied, certain of the said lasts or forms being omitted for the sake of clearness. Fig. 10, Sheet 9, is a view showing the same from the left in Fig. 1 with the lasts or forms omitted. Fig. 11, Sheet 9, is a view from the left in Fig. 1 of the portion of the work-carrier which is provided with the clamping arms. Fig. 12, Sheet 9, is a plan view of the portion of the work-carrier which is shown in Fig. 11. Figs. 13 and 14, Sheet 10, are details of one of the lasts or forms and portions of the supports therefor. Figs. 15 and 16, Sheet 7, are details on an enlarged scale of one end of a swinging tool-carrier and the parts which are connected therewith. Figs. 17 and 18, Sheet 5, are detail views showing the arm of one of the swinging tool-carriers which is located at the end thereof opposite that where the tool is mounted, Fig. 18 being a view in section on the line 18, 18, of Fig. 17. Fig. 19, Sheet 10, is an end elevation, Fig. 20 a side elevation and Fig. 21 a partial plan of the breasting-cutter. Fig. 22, Sheet 10, is a side elevation and Fig. 23 an end elevation of one of the collars to which reference is made hereinafter in the description of the breasting-cutter. Fig. 24, Sheet 10, is a side elevation of a portion of the notched slide or plunger 91 of the breasting-cutter, and Fig. 25 is an end elevation thereof. Fig. 26, Sheet 10, is a side elevation, and Fig. 27 is a partly sectional end elevation of the device for applying blacking. Fig. 28, Sheet 11, shows in plan, Fig. 29 in front elevation, and Fig. 30 in elevation viewed from the left in Fig. 1, the gage to assist in properly placing or setting the boots or shoes when applying them to the jacks of the work-carrier. Fig. 31, Sheet 11, is an elevation viewed from the left in Fig. 1, Fig. 32 is a partly sectional plan view, and Fig. 33 is a view partly in section on a different plane, showing beading and burnishing devices. Fig. 34, Sheet 12, shows in end elevation, and Fig. 35 shows in vertical section, a trimming cutter. Fig. 36, Sheet 12, shows in end elevation, Fig. 37 shows in side elevation, and Fig. 38 shows in plan, a modified form of beading device. Fig. 39, Sheet 12, shows in end elevation, and Fig. 40 shows in vertical section a scouring tool and the means of connecting it with its carrying and operating shaft with provision for convenient removal and replacement.

The invention consists in various features of improvement which we have conveniently illustrated in the accompanying drawings, and which we will now proceed to describe with reference to the said drawings.

In our improved machine a boot or shoe requiring to have the heel thereof finished is applied to a jack, and while on the latter is brought into working relations with a number of finishing tools in succession, so that while the boot or shoe is in the machine its heel is automatically subjected to the required variety of finishing operations in the desired succession. We employ a series of finishing tools, and also a work-carrier furnished with a number of jacks arranged to receive and support a number of boots or shoes at a time while the heels thereof are simultaneously being acted upon by the finishing tools, the said work-carrier having combined therewith power-actuated shifting devices under the control of the operator, whereby, at the will of the operator, the work-carrier is shifted step by step so as to cause the heel of each boot or shoe in turn to be exposed to the action of the respective finishing tools, successively, of the series which is comprised in the machine.

The machine is provided with a driving shaft 1, Figs. 1, 2, 3, 4 and 7, in connection with which will be employed in practice suitable means of transmitting driving power thereto and of shipping the said power on and off. Figs. 1 and 2 show fast and loose band-pulleys 2, 3, of usual character for the purpose of receiving a driving band through which the driving power is transmitted.

In Fig. 1 of the drawings, for the sake of clearness, only one shoe 4 is shown, it being represented as supported in position to place its heel under the action of one of the tools of the machine. The work-carrier 5 is furnished with a plurality of work-supports or jacks 6, 6. It is mounted upon a shaft 7, the latter having suitable bearings at 8 9 in connection with the machine frame, in which bearings said shaft is adapted to rotate and also to slide longitudinally. The work-supports or jacks are arranged in a circular series upon the work-carrier. The number thereof is greater than the number of tool-shafts in the series of the latter, in order that one or more of the said work-supports or jacks shall occupy an intermediate position relative to the tools which will permit a boot or shoe which has been subjected to the required operations in turn to be removed from its work-support or jack and another applied to the latter. The machine shown has been especially contrived with the object in view of enabling tools upon six tool-shafts to be employed, and the work-carrier is provided with eight work-supports or jacks. The machine, therefore, has six working points, which are two less in number than the work-supports or jacks.

In different machines the number of tool-shafts provided may and will be varied in practice to meet the views and needs of the users of the machines, and hence while we have shown six tool-shafts and a work-carrier having eight work-supports or jacks we would have it understood that these particular numbers are not essential to the invention and may be varied from as found advisable to meet the requirements of practice. The work-carrier is shown constructed with two radiating series of arms. One arm of each of the said series coöperates with the corresponding arm of the other series in the support of a boot or shoe, and hence such a pair of arms with their appurtenances constitute a work-support or jack.

The construction of the work-supports or jacks may vary in practice to suit the needs in use or the views of the builders and users of our machine. We have shown herein work-supports or jacks embodying the features of invention which are claimed in our divisional application for U. S. Letters Patent for jack for boot and shoe machinery filed March 29, 1905, Serial No. 252,617.

The arms 10 10 of one set of arms, see Figs. 1, 2, 9 and 10, have screw-threaded holes formed through their outer extremities 11 11 and receive therein hand-screws 12, 12, each carrying at its inner end a form or last at 19, Figs. 9, 13 and 14. The arms 13, 13, of the other series, see Figs. 1, 2, 11 and 12 have pivoted thereto, as at 14, 14, clamping arms 15, 15, to the outer extremities of which in turn plates or blocks 16, 16, are swiveled or hinged, the said plates or blocks being intended to bear against the exposed faces of the heels of the boots or shoes that are mounted upon the lasts or forms which are carried by the hand-screws 12, 12, of the other series of arms. The inner extremity of each hand-screw 12 has the corresponding last or form 19 removably connected therewith in suitable manner to prevent accidental disengagement of the last or form from the hand-screw.

In Figs. 13 and 14, Sheet 10, the end of the hand-screw is entered into a socket 18 in the last or form 19. The said end is formed with a circumferential groove 20, Fig. 9, Sheet 9, and the last or form has a transverse slot 21, Fig. 9 and Figs. 13 and 14, Sheet 10, within which is fitted a latching lever 22, one extremity of which is acted upon by a spring 223 conveniently contained within a cavity in the last or form, while the other extremity thereof enters the circumferential groove 20 of the hand-screw. For retaining the last or form in a predetermined position upon the work-carrier, usually radial, while permitting the same to be adjusted transversely with relation to the tools, a pin 23, Fig. 9, Sheet 9, and Fig. 13, Sheet 10, is attached to each arm 10, the said pin extending parallel with the hand-screw and being received within a hole 24 that is formed within the body of the last or form parallel with the socket for the hand-screw. The said pin holds the last or form from turning relatively to the work-carrier, but the last or form is left free to be adjusted as desired in the direction of the length of the hand-screw by means of the hand-screw.

The pivoted clamping arms 15, 15, Figs. 1 and 2, and Figs. 11 and 12, Sheet 9, of the other portion of the work-carrier are furnished with worm-gear segments 26, 26, that are engaged by worms 27, 27, the said worms being mounted to turn in bearings in the fixed arms, and being provided with hand-wheels 28, 28, for convenience of manipulation. By means of these worms and their hand-wheels the pivoted clamping arms 15, 15, may be operated to cause their swiveled plates or blocks 16, 16, to bear against the faces of the top-lifts of the heels which are opposite the same, or to withdraw said swiveled plates or blocks from contact with the said top-lifts. The use of the worms and worm-wheels for adjusting the pivoted arms and their clamping plates or blocks is preferable to the use of pawl and ratchet devices for the same purpose. Pawls are liable to become disengaged from their ratchets by the jar of the machine, and they do not permit a sufficiently accurate adjustment of the parts to enable the heel-seat of a shoe to be adjusted with precision relative to the tool. The worms and worm-wheels, on the other hand, hold the pivoted arms securely locked in the position which is given to the latter. They are not subject to such rapid wear as in the case of the ratchets, and consequently are less liable to get out of order. They permit, moreover, a delicate and exact positioning of the heel-seat of a boot or shoe relative to the cutter and other tools which are intended to act upon the heel.

It is important to effect adjustment to a nicety of the heel-seat of a boot or shoe which has been applied to a work-carrier or jack relative to the working tools, so that possibility of injury to the upper of a shoe by any of the tools shall be precluded, while the heel itself shall be perfectly and completely operated upon from the heel-seat to the bottom or outer face of the top-lift.

The thickness and compressibility of the uppers of boots and shoes, of the inner soles thereof, and of the counter-stiffeners, vary quite considerably in practice, and inasmuch as the combined thickness, after compression between the last or form and the opposing plate or block 16, of upper, inner sole, and counterstiffener flanges, intervening between the bottom of the last or form and the heel-seat of a boot or shoe, determines the distance of the said heel-seat from the said bottom of the last or form, it is evident that as the said combined thickness varies the said distance will also vary. Consequently, in the machine the position of the heel-seat of a boot or shoe, mounted on one of the lasts or forms, relative to a tool to which the boot or shoe is presented for action, would vary in different boots or shoes according as such combined thickness varies, if adjustment were not made in order to compensate therefor. This would result in some cases, if the said combined thickness should be sufficiently great, in bringing the upper of the boot or shoe adjacent the heel-seat within the range of action of the tool to which it is presented, with resulting injury to the upper. If the thickness were too slight, the upper portion of the heel at the heel-seat in some cases would not be presented within the range of action of the tool, and consequently the heel would not be completely finished; in others, injury to the heel would result from the action of a tool thereon at one side of the heel-seat. The variations which have just been referred to in the case of successive boots or shoes may be compensated for by the operator, if desired, by making adjustment of the hand-screws 12, 12. In this connection, however, we have aimed to render it possible to make one adjustment of the hand-screws 12, 12, before beginning work upon a given line of shoes, and thereafter leave them undisturbed in their adjustment, and to effect the required positioning of the boots or shoes relative to the respective tools in jacking the boots or shoes by moving the clamping arms 15, 15, through the agency of the worms 27, 27, and worm-wheels 26, 26. This has the advantages of rendering it unnecessary to use both hands in effecting the required adjustments during jacking, and expedites the performance of the jacking operations. To this end, each last or form is made yielding in a direction transverse with reference to the finishing tool. The capacity for yielding may be secured in a variety of ways.

In the drawings the bottom of each last or form has applied thereto a yielding bearing portion intended to make contact with the surface of the inner sole of a boot or shoe that is applied to the last or form. As the clamping block or plate on the pivoted arm of the jack is caused by the adjustment of the said arm to press against the exposed face of the top-lift of the heel of the boot or shoe, by the turning of the corresponding worm by the operator, the said yielding bearing gives way under the pressure. In this way the boot or shoe may be forced transversely until the heel-seat thereof is seen to be in proper position relatively to the tools. Herein, the said yielding bearing is constituted by a bent plate or strip of spring material 29 (Figs. 9, 13 and 14, Sheets 9 and 10) which is secured at one end to the bottom of the last at or near the toe-end of the latter, the other end being free and being sprung away from the bottom of the last to the required distance to provide for the desired amount of adjustment.

For the purpose of holding the boot or shoe which is mounted on the last or form firmly against turning upon the latter while being acted upon by the tools, the last or form is furnished with spurs or points 30 projecting from the bottom thereof for engagement with the inner sole of the boot or shoe. In the present instance the said spurs or points are arranged in position to pass through holes 31 that are made for the purpose in the spring-strip or plate that is attached to the bottom of the last or form as aforesaid. In the normal outsprung position of the said strip or plate, the latter stands beyond the ends of said spurs or points and covers or shields the latter, so as to enable a boot or shoe to be slipped onto the last or form without engagement of the spurs or points with the material of the boot or shoe, as, for instance, with the surface of the inner sole, which would result in injury thereto. When the pivoted arm and its block or plate are adjusted by the operator to clamp the boot or shoe firmly to the last or form, the spurs or points protrude through the holes in the spring-strip or plate as the latter is compressed, and enter into the inner sole. When the pressure of the said block or plate against the face of the heel is relieved, the strip or plate springs away from the bottom of the last or form again, once more covering or shielding the spurs or points, so that the latter shall be prevented from interfering with the removal of the boot or shoe, and from occasioning injury to the latter.

The various finishing tools which are employed in the machine are arranged in proper position adjacent the path which is taken by the heel of a boot or shoe that is supported upon and being carried around by the work-carrier. The number and character of the said tools will be varied in practice in accordance with the character and needs of the work to be performed. The said tools are arranged in the order in which they are required to come into service in connection with a heel. The work-carrier is given a step-by-step or intermittent rotative movement, each advance thereof being sufficient to carry a shoe from one tool to the next. The successive advances of the work-carrier present the said boot or shoe to each of the tools in turn. After a boot or shoe has had the heel thereof subjected to the required number of operations, it is removed by the operator from its jack during the dwell of the work-carrier, and a fresh shoe requiring to have its heel operated upon is applied to the said jack. In the illustrated machine the application and removal are effected by one operative at the front of the machine, but it will be obvious that in some cases the application may be effected at one side of the machine and the removal at the other, and when this is done two operatives will be required, one standing at each side of the machine.

We have shown provisions for the employment of five rotating tool-shafts carrying tools for working on the periphery of the heels to be finished, and a reciprocatory breasting-cutter. The number of tools, and the precise character of the various tools, are not essential to the invention. In some cases, less than the full number of tools provided for may actually be employed, the others being omitted or removed. The tools of the present machine, might comprise, for instance, a trimming-cutter, a scouring tool, a blacking tool, a burnishing tool, a beading tool, and the breasting cutter, these being disposed in the order in which they have just been named.

The five rotary tool shafts are shown at 32, 33, 34, 35 and 36. During the momentary dwell of the work-carrier, with the respective work-supports or jacks thereof adjacent the respective tools, holding the shoes on said jacks in position to be acted upon by the said tools, each rotary tool-shaft is caused to travel around the circuit of the heel upon which its tool is acting. For the purpose of causing the said tool-shafts and tools to travel or swing around the heels in the manner just referred to, each tool-shaft is applied to a swinging or rocking tool-carrier; thus, the bearings 37, 38 for each rotary tool shaft are applied to a pair of arms 39, 40 carried by opposite ends of a rock-shaft 41 which is furnished with suitable bearings upon the framework of the machine. Each rock-shaft has affixed thereto a spur-pinion 42, Figs. 1, 2 5 and 6, which is in mesh with a toothed surface which herein is constituted by a curved rack in the form of a sector-gear 43, the latter being mounted on the shaft 431, which last is mounted in suitable bearings which are provided on the machine framing. This sector-gear has fast therewith a spur-pinion 44, Fig. 5, and with the latter engages a toothed rack 45 on a bar 46 carrying a stud or roll 47 working in the groove 48, Fig. 5, of a cam 49 fixed on a rotating shaft 50 mounted in bearings in the lower part of the machine. As the said shaft 50 and its cam 49 are rotated, the endwise movement of the rack-bar 46 which is communicated to the latter by the cam acts to occasion an oscillating movement of the sector-gear and causes the rocking-carriers of the tool-shafts to rock or swing first in one direction and then in the reverse direction. The rack-bar is guided in its reciprocatory movements by means of pins or rolls 51, 51 the bearing 38 at the opposite end of the tool-shaft rocks or swivels upon the said trunnions or pivots.

For the purpose of adapting the mechanism, after working in connection with heels of a given size, to operate in connection with heels of a different size, without having to change the form or pattern 54, we make provision as follows. The bearing 37 and leader or follower 59 are made relatively adjustable, so as to enable the said bearing to be shifted relative to said leader or follower toward or from the axis on which the tool-carrier rocks or swings. In the present instance, the leader or follower 59, Figs. 15 and 16, Sheet 7, is formed with a slot 591 within which the bearing 37 is fitted, the opposite sides of the bearing having flattened portions which make sliding contact with the opposite sides of the slot 591. A pin or stud 67 having a screw-threaded stem is secured to the bearing 37, and projects outward. To the said threaded stem is applied the thumb-nut 69, the latter having a circumferential rib 691 engaging with the cap 66 covering the outer end of the slot 591 of the leader or follower. Thumb-nut 69 is free to rotate, but cannot move radially independently of said cap, and consequently, when said thumb-nut is rotated, the bearing is adjusted radially.

The bearing 38, Figs. 17 and 18, Sheet 5, is made radially adjustable, also, in order to suit the different sizes of heels upon which it is desired to work, and also in order to secure the desired inclination of the tool-shaft and tool relative to the axis of the rockshaft 41. Thus, the trunnions 70, 70 with which the said bearing is provided at the opposite sides thereof are fitted to bearings which are formed in slides 71, 71 located between the opposite sides of the bearing and the opposite side-portions of the slotted arm 39. The said slides have laterally extending projections fitting and working in the radial guide-slots 72 in the said side-portions.

The slides 71, 71, are engaged by a cross-head 73, in which latter is a hole receiving a thumb-nut 74 that is fitted to a screw 75 fixed to the inner portion of the arm 39. The enlarged or, flanged upper end of the thumb-nut fits upon the top of the cross-head, and a ring or washer 76 is applied to the thumb-nut below the cross-head. Thereby, the thumb-nut is prevented from having movement vertically with relation to the cross-head, while permitted to turn in the hole within which it is fitted. By turning the thumb-nut the cross-head, slides, and bearing, may be adjusted toward or from the axis of the rockshaft 41 of the tool-carrier, to suit the size of the heels being operated upon, and to place the tool-shaft either in parallelism with said rockshaft or at an angle or inclination with respect to the rockshaft corresponding with the bevel or inclination which the exterior surface of the heel is required to have; that is to say, so that the exterior of the tool will conform in position to the desired shape of the exterior of the heel, and stand at the angle or inclination which the said exterior is required to have. This capacity for adjustment of the angle or inclination of the tool-shaft enables the slope or inclination of the exterior surface of the heel with relation to the top-lift to be varied through a considerable range, as required in the case of the heels of footwear for men or women. As the tool-carrying end of the tool-shaft swings toward and from the axis of the rockshaft of the tool-carrier in following around the periphery of the pattern, causing the axis of said tool-shaft to swing toward and from parallelism with the axis of the rockshaft, the bearing 38 at the inner end of the tool-shaft swivels on its said pins or trunnions 70, 70.

In order to communicate movement of rotation to the tool-shafts, the latter respectively are connected by lengths of flexible shafting, 76 76, Figs. 1, 2 and 4, containing universal joints 77, 77, Figs. 1 and 2 with operating shafts 78, 78, at the right hand end of the machine in Figs. 1 and 2. As shown in Figs. 1, 2, and 3, the said operating shafts are furnished with band-pulleys 79 79 receiving driving-bands 80 80 which also pass around band-pulleys 81 81 on the driving-shaft of the machine. When the tool-shafts are required to rotate at different rates of speed, the band-pulleys on the said driving shaft will vary in diameter, as shown, and when two or more tool-shafts are required to rotate at the same rate of speed the same band may be arranged as in Fig. 3 to pass around the band-pulleys of the corresponding operating shafts, suitable idler or tension pulleys 82 being provided, as shown.

The bearing 37 is fitted to the tool-shaft in well-known manner so as to prevent end-play of the bearing and tool-shaft relative to each other, and in order to control the endwise position of the tool-shaft during the radial movement thereof inward and outward, so as to cause the tool to follow the line of the heel-seat, the opposite side-portions of arm 39 are slotted, as at 58, Fig. 16, Sheet 7, and within each slot 58 is fitted a slide-block 571 which is connected with the bearing 37. Hence, as the bearing moves radially, the said slots 58 control its position and that of the tool-shaft endwise so as to cause the tool to act properly with relation to the line of the heel-seat. Thereby the tool is guided during its radial movements so as to cause the slight lateral movement thereof whereby it is made to follow the line of the heel-seat. We have shown the bearing furnished with oppositely projecting pins or trunnions 57, 57, fitting holes in the blocks 571, 571, thereby permitting of a relative rocking movement between the bearing and the blocks.

For the purpose of enabling the machine to be adapted readily to work in connection with heels having heel-seats with different degrees of curvature, the guiding portion of the arm 39 is made adjustable. Herein, the arm is made in two parts, namely, an inner member 401 made U-shaped as shown, and an outer member 402 fitting between the branches or sides of the former and having flanges or ears 64, 64, which project out beyond and overlap the said branches or sides. The two members of the arm are connected together by means of pivots 403, 403, projecting from the said branches or sides of the inner member and fitting holes in the said flanges or ears. This construction of the arm, and mode of connecting the two parts thereof together, enables the slotted guiding portion 402 to be swung on the pivots as required in order to give any angle to the guides which may be necessary to suit the heel-seats of the particular lot of shoes to be handled.

For the purpose of fixing the parts in position after they have been set or adjusted so as to position the guides properly, each or either of the ears of the outer part of the arm is formed with a segmental slot 404, Fig. 16, that is concentric with the pivots 403 403 connecting the two parts. Through the said slot extends the stem of a threaded stud 405 projecting from the corresponding branch of the fixed inner part of the arm. By means of a nut 406 and washer 407 applied to the said stud the two parts of the arm are clamped together fixedly.

The breasting cutter 90 (see Figs. 1, 2, 19, 20 and 21, Sheets 1, 2, and 10) is attached to a slide or plunger 91 moving in a horizontal line and supported by bearings 92 93 in a suitable stand 94 that is attached to the machine-framing. A collar 95 fitted to the said slide or plunger is connected by means of a rod 96 to a crank 97 at one end of a short inclined shaft 98 mounted in a suitable bearing 99 carried by the machine-framing, the other end of the said inclined shaft having affixed thereto a bevel-gear 100 meshing with a like gear 101 on the shaft 50 carrying the cam 49 by which is actuated the rack-bar 46, aforesaid, employed for communicating rocking movement to the tool-carriers.

After each movement of the work-carrier, serving to advance the boots or shoes thereon one stage in the series of finishing tools, and during the dwell thereof in its new position, the tool-carriers are caused to rock so as to carry the respective tools connected therewith around the heels which are in position to be acted upon by the said tools, and at this time also the breasting cutter is caused to act to trim the breast-portion of the heel which is in position to be acted upon by the said breasting cutter. The rocking tool-carriers are operated to carry the corresponding tools from the starting points at the breasts of the heels on one side of the latter, around the backs of the heels, to the breasts at the other sides of the heels, and then reversely to the starting point, after which the tool-carriers stand at rest. The work-carrier then is advanced another step, and so on alternately.

We make provision for varying, when required, the extent of the rocking or swinging movement of the tool-carriers, in order that the same may correspond with the length of heel to be operated upon. The said movement must be sufficient to carry the tools entirely around the circuit of the heels, but requires to be reduced for small heels so that the tools will not be carried into the shank-portions of the soles too far. The desired result may be attained in different ways within the skill of the mechanic. Herein we have shown provisions for enabling a predetermined amount of lost motion to occur in the action of the devices for transmitting rocking movement to the tool-carriers, and means for adjusting the extent of such lost motion.

Having reference to Fig. 5, Sheet 5, the rack 45 is capable of play, lengthwise of rack-bar 46, between adjustable collars or nuts 461, 461, on said rack-bar. By setting said nuts or collars so as to increase or diminish the amount of lost motion, the extent of the movement which is transmitted to the tool-carriers will be varied in obvious manner.

For the purpose of rotating the cam 49 and driving bevel-gear 101 we employ in connection therewith a driving train embracing start-and-stop devices by means of which the said driving train is made operative to start the said cam and bevel-gear and rotate the same until the required operations of the tools upon the heels in position adjacent the same have been effectuated, after which the said driving train automatically is disconnected to discontinue the working of the cam and driving bevel-gear for the purpose of enabling the operator to remove from the work-carrier a shoe which has had the heel thereof subjected to the required number of finishing operations, and apply a fresh shoe to be operated upon, and, also, for the purpose of affording an opportunity for an advancing movement of the work-carrier. Preferably, the said start-and-stop devices are of a type enabling the operator to start the rotation of the said cam and driving bevel-gear at will, the said rotation being discontinued automatically at the termination of the required extent thereof.

Various constructions and arrangements of driving mechanism containing automatic start-and-stop mechanism suitable for use in the present connection are known and may be employed, as deemed desirable. By preference we employ a driving train containing a friction-clutch and in connection therewith a shipper which is automatically controlled and also is under the control of the operator. A friction-clutch has the advantages that the members thereof are capable of being separated, if desired, at any instant in the rotation of the cam and driving bevel-gear, as for the purpose of obviating accidents or injury to the work, and for the purpose of affording opportunity to inspect the work in process of being finished; and also that it enables the cam and driving bevel-gear, together with the parts which are operated from the latter, to be started without shock or jar. In the present embodiment of our invention, we employ a loose band-pulley, 102, Figs. 1 and 2, which is driven by a band 103 from a band-pulley 104, Fig. 2, on the driving shaft 1 of the machine, the said band-pulley being formed or provided with one member of a friction-clutch as shown at 105 in dotted lines in Fig. 1. The other member 106 of said friction-clutch has combined therewith a spur-pinion 107 meshing with a spur-gear 108, the said spur-gear having fast therewith a spur-pinion 109 meshing with a spur-gear 110 fast on the shaft 50 carrying the said cam 49 and driving bevel-gear 101. For convenience in construction, and to gain compactness, we mount the two clutch-members 102 and 106, and the spur-pinion 107, loosely upon the said shaft. The shipper for the said friction-clutch is constituted by a lever 111 having a fork 112 in engagement with the grooved hub 113 of the loose band-pulley, the said shipper being acted upon by a yielding force, suitably originating and operating with a tendency to separate the clutch-members. Herein, we employ a spring 114, Fig. 1, which is shown connected with the machine-framing and also with a lever 115 that is united to the shipper by a connecting-rod 116.

For the purpose of enabling the operator to move the shipper to close the clutch when it is desired to start the movement of the tool-carriers and breasting-cutter, a treadle 117 is provided, the latter being in operative connection with the said lever 115. For the purpose of holding the clutch closed while the required movements are being communicated to the tool-carriers and breasting-cutter, a controlling cam 118 is made fast on the shaft 50, the face of which cam acts, after the said shaft has begun to rotate, against a pin or roll 124 carried by an arm 119 which is in operative connection with the shipper 111. The said connection is established in the present instance by means of a pin 120 projecting from the arm 119 into a slot 121 (shown in dotted lines in Fig. 1) that is formed in connecting-rod 116. Normally, the said pin is held locked at one end of the said slot, as by means of a movable hooked latch 122 which is pivoted to the lever 115 at 221, Fig. 1, and thus the arm 119 and connecting-rod 116 are locked together so that they are compelled to move in unison. During the rotation of the controlling-cam 118, the face thereof acts against the stud or roll 124 of the arm 119 to hold the shipper in position to keep the clutch in closed and operative position. At the end of the required rotation of the cam 49 and driving bevel-gear 101 the driving-power therefor is thrown off automatically, this action being governed by the said controlling-cam, which latter is formed in one portion of the circuit thereof with a notch or depression 123. When, in the rotation of the said controlling-cam, this notch is presented to the stud or roller 124 carried by the arm, the spring 114 is permitted to move the parts with which it is connected in a direction to open the friction-clutch and throw off the power. Until the said notch or depression in the controlling-cam arrives in position to receive the said stud or roller, the face of the said cam acts to hold the shipping-devices in position to maintain the clutch in a closed and operative condition.

For the purpose of enabling the friction-clutch to be unshipped at will by the operator at a moment when the notch or depression of the controlling-cam is not in position to receive the stud or roller of the arm aforesaid, as in case of need or emergency arising while the tools are working upon the heels of a set of boots or shoes upon the work-carrier, the latch 122 is made movable out of engagement with the pin 120 on the said arm, and is provided with a suitable projection 1224 by which it may be moved for the purpose of effecting the disengagement of the same from the pin 120. When the latch is lifted, the slot in the connecting-rod allows the shipping devices to be moved independently of the said arm 119 by the spring far enough to open the clutch. The latch may be variously constructed and applied. A convenient form thereof is shown in Fig. 1, in which the latch is pivoted to the lever 115 at 221 and has a nose which is beveled off on the under side thereof to enable said nose to rise up over the pin and reëngage automatically therewith.

The emergency stopping devices are intended to enable the transmission of movement to the tool-carriers and breasting-cutter to be arrested at will at any instant. The projection 1224 may be taken hold of by hand, if desired, for the purpose of disengaging the latch 122, or any suitable arrangement for enabling the operator conveniently to lift the latch may be employed. We have shown in Fig. 1 one arrangement, the same comprising, essentially, an irregularly shaped lever 1222, which is pivoted to the lever 115 at 221 and provided with a pedal 1225. The working arm of lever 1222 extends beneath projection 1224, in position to engage therewith to lift latch 122 when pedal 1225 is pressed upon.

For the purpose of arresting quickly the rotation of the shaft 50 after the clutch has been unshipped by the operator in the manner just described, a suitable stop or brake-device is provided. Thus, the lever 1222 may be extended and arranged so that when pedal 1225 is pressed upon the free extremity of its working arm will be pressed against the side of the member 106 of the friction-clutch as will be apparent from Fig. 1.

For the purpose of arresting promptly the rotation of said shaft 50 after the clutch has been unshipped automatically, as described, a brake-pulley 1061, Fig. 2ª, Sheet 3 is connected with the member 106 of the friction-clutch, and to the same is applied the brake-band 1062, which is connected with brake-lever 1063, the latter being engaged by the cam 1064 on shaft 50.

The operation of the work-carrier is effected as follows:—For the purpose of relieving the operator of the strain and fatigue which would be incident to moving the work-carrier manually, as well as for the further purpose of leaving him free to attend to other duties, we employ power-actuated operating devices which are contrived and arranged to communicate the necessary movements to the work-carrier. By means of the said devices the work-carrier is rotated step-by-step, each advancing movement of partial rotation serving to advance the respective work-supports or jacks thereof through a distance corresponding with that which separates them from one another. As will be obvious to those skilled in the art, successive advances of the work-carrier will thereby act to occasion relative movement between the work-carrier and tools, to cause each boot or shoe on the work-carrier to be subjected to the respective stages of the operations successively. In other words, the successive movements of the work-carrier will present a boot or shoe which is mounted on one of the work-supports or jacks thereof to each of the tools in succession, and after having carried the same past the series of tools will present it at the point in the machine at which the removal of the boot or shoe from the said work-support or jack is effected. By placing boots or shoes upon the work-supports or jacks as they come around in succession into position opposite the operator, a constant succession of boots or shoes can be kept passing through the machine, as will be apparent, and at any given moment a certain number thereof will simultaneously be undergoing the finishing operations in the various or successive stages of the latter. We will now proceed to explain the intermittent motion actuating mechanism which we have shown in the drawings for the purpose of communicating to the work-carrier the said movements of partial rotation. See Figs. 1, 2, 7 and 8, Sheets 1, 2, 7 and 8. A driving-band 150 extends from a pulley 151 on the driving shaft 1 at the side of the machine, around a somewhat larger pulley 152 on the shaft of which is a spur-pinion 153 meshing with a spur-gear 154 which ordinarily turns loosely upon the operating shaft 155 for the work-carrier. The said operating shaft is operatively connected with the shaft of the work-carrier for the purpose of communicating movements of partial rotation to the work-carrier, as aforesaid, by devices which may vary in practice. We have shown herein a crank 156 on the work-carrier operating-shaft, a connecting rod 157 joined with the said crank, a swinging arm or pawl-carrier 158 loosely mounted concentrically with the shaft of the work-carrier, a pawl 159, Fig. 2 connected with the said arm or pawl-carrier, and a ratchet wheel 160 which is connected with the shaft 7 of the work-carrier. In the present instance, each rotation of the work-carrier operating shaft will advance the work-carrier through one-eighth of a revolution. Any suitable provision may be made for preventing overrunning of the work-carrier after each advance thereof. Herein we have shown the shaft 7 provided with a brake-pulley 161 which is surrounded by a brake-band 162, the latter being operated by means of a lever 163 and a cam 164 fast on the work-carrier operating shaft 155. This cam is set to apply the brake at the end of each revolution of the said operating-shaft.

It is necessary prior to each advance of the work-carrier to occasion a relative movement of the work-carrier and tools laterally with respect to each other; that is to say, to occasion a relative movement in the direction of the length of the shaft of the work-carrier a sufficient distance to cause the boots or shoes and all portions of the work-supports or jacks carrying the same to entirely clear the tools in advancing, and afterward restore the parts to their normal relative positions, laterally, after the completion of the advance. This relative movement most conveniently is effected by giving an axial movement to the work-carrier, and in the present instance for the purpose of permitting such movement, the shaft of the work-carrier is mounted with capacity to slide lengthwise within its supports. The ratchet-wheel 160 and brake-wheel 161 are fast upon a sleeve 1601, Fig. 1ª, surrounding the shaft 7 of the work-carrier and splined to the latter. The outer end of the shaft of the work-carrier has fixed thereon a grooved collar 165 which is engaged by a shifter-fork 166 which is operated by the grooved cam 167 on the work-carrier operating shaft.

Preferably, in connection with the power-driven actuating devices for the work-carrier, we employ manual controlling devices for the purpose of enabling the said actuating devices to be caused to act at the will of the operator. Thus, we provide in the present instance start-and-stop mechanism including clutch-devices of the well known Horton type, and manually-controlled shipper-devices coöperating therewith. As shown in the drawings, the disk 170 pertaining to the Horton clutch has a shoulder 171 at the periphery thereof which engages in usual manner with the controlling-dog or pawl 172 for the purpose of holding the clutch open. For the purpose of holding the said dog or pawl in position for engagement with the said shoulder on the said disk, it has connected therewith a spring 1721 tending to throw its engaging end into the path of rotation of the said shoulder. So long as the dog or pawl remains in engagement with the shoulder, the clutch remains open and no movement is imparted to the work-carrier operating shaft. For the purpose of enabling the driving-connections to be clutched to the work-carrier operating shaft at the will of the operator the hub 173 of the said dog or pawl, see Fig. 8, is formed with a shoulder 174, which latter in turn is engaged by a dog 175 that is pivoted on one arm of the lever 176, which lever itself is mounted to turn upon the same center with the first mentioned dog or pawl but independently thereof. The said lever is connected by a rod 177 with one arm 178 of a rock-shaft 179 having a second arm 180 thereof connected by a rod 181 with an arm 182 on a treadle rock-shaft 183, the latter having applied thereto a treadle 184 acted upon by a spring 185. The said spring tends to move the parts in a direction to permit the engaging end of the disengaging dog or pawl 172 to stand in the path of rotation of the shoulder 171 on the disk 170 of the clutch, but pressure exerted by the operator upon the said treadle withdraws the disengaging dog or pawl from the said shoulder and permits the clutch to close, thereby connecting the gear and the work-carrier operating shaft together.

For the purpose of automatically disconnecting the clutch at the end of a single revolution of the work-carrier operating shaft, in case pressure is maintained upon the treadle 184 by the operator, the said operating-shaft has mounted thereon a tripping-cam or tappet 186 which latter at the required instant in the rotation of the said operating-shaft strikes the tail 187 of the tripping-dog or pawl 175, disengaging the latter from the disengaging dog or pawl 172 and permitting the latter to be swung by its spring into the path of rotation of the shoulder 171 of the disk 170 pertaining to the clutch. The movement of the treadle 184 and its connections when the same are operated to raise the disengaging dog or pawl, that is to say, to withdraw it from the path of rotation of the shoulder on the disk 170 pertaining to the clutch, causes the tripping tail 187 to be raised into the path of rotation of the tripping cam 186.

It will be observed that in the preferred embodiment of that portion of the invention which resides in the power-actuated shifting-devices for the work-carrier, the said devices are normally inoperative to shift the work-carrier, and are rendered operative to occasion the advance of the work-carrier at the will of the operator, when all is in readiness for such advance to be made.

When the breasting-cutter 90 is advanced and acts upon the heel which is in line therewith, considerable strain is imposed upon the pair of arms of the work-carrier which support the shoe to which such heel pertains. For the purpose of backing up or supporting said arms against springing under the said strain, we provide a backing-up device 201 which is mounted upon a stand 202 on the machine-framing adjacent the work-carrier. The movement of the work-carrier which places a pair of work-supporting arms in line with the breasting-cutter, presents the said arm 10 of said pair alongside the backing-up device 201, so that when the breasting-cutter acts the tendency of the resulting pressure to spring the work-supporting arms is withstood by the backing-up device. In the present instance each arm 10 of the work-carrier is furnished with a projecting portion 203 Fig. 8, Sheet 8 to coöperate with the backing-up device 201. We have shown the backing-up device movable into and out of working position, and connected with the treadle 184, so that when the said treadle is depressed the backing-up device 201 is moved from its working position so as to leave the work-carrier free from obstruction to its movements. The backing-up device 201 is shown constituted by an arm which is journaled at 204 upon the stand 202, and connected by the connecting-rod 205 with the treadle 184. The action of the spring 185 in raising the treadle 184 also restores the backing-up device 201 to its normal position shown in Figs. 7 and 8. In order to afford clearance for the breasting-cutter as it advances to act against the heel, each clamping arm 15 of the work-carrier is bent or curved laterally as at 206 so as to extend around the path of movement of the breasting-cutter. See Fig. 11, Sheet 9.

Figs. 34 and 35, Sheet 12, show the construction of the trimming cutter 321, and certain improved features which we have embodied therein. The cutter-carrying tool-shaft 32 is formed with the tapered bearing-portion 322, fitting the correspondingly tapered end-portion of the interior of the bearing 37. The extremity of the tool-shaft 32 projecting beyond the said bearing is screw-threaded as at 323 and 324, the inner (323) of these two threaded portions being slightly larger in diameter than the outer (324). The two heads of the cutter are designed 325 and 326, respectively, and the cutter-blades are indicated at 327, 327, the said heads being grooved to receive the opposite edges of the cutter-blades, in usual fashion, and being clamped against said edges to hold the blades in place, as ordinarily. In conformity with this portion of the invention, we render the cutter-head adjustable upon the shaft 32 in the direction of the length of the latter by the construction which we will now describe. The central opening or eye of the inner head 325 is threaded to fit the threaded portion 323 of the shaft 32, and after having been turned upon the latter until it has been caused to assume the desired position it is secured in place by the jam-nut 328 which also is applied to the said threaded portion 323. The outer head, 326, is splined to the shaft 32, as at 329, so as to be capable of endwise movement thereon, but not of turning relative thereto. The jam-nut 330 fitted to the outer threaded portion 324 of the shaft 32, bears against the outer side of the head 326 so as to cause the latter to clamp the cutter-blades 327, 327, between itself and the inner head 325. The advantages of the foregoing are the simplicity and strength of the construction and the convenience with which the cutter-head may be adjusted upon the shaft 32 in a direction lengthwise of the latter.

Figs. 39 and 40, Sheet 12, illustrate a rotary scouring tool which may be employed if desired and our improved means of securing the same and similar tools upon the shafts which carry the same. The scouring tool is designated 301, and it is slipped upon the end of the tool-shaft 33 which projects beyond the bearing 37. For the purpose of securing the tool upon the end of the shaft, the said end is furnished with a transversely extending pin or equivalent projection, as 322. The interior of the hub of the tool is formed with a longitudinal groove 333, and in applying the tool to the shaft the tool is held in position to present the groove 333 to the pin 332. The tool may now be slipped on to the shaft, the pin passing through the groove 333. When the tool is fully on it is turned part way around, so as to shift the groove away from the pin.

For the purpose of preventing unintended relative movement between the tool and shaft 33 which would place the groove and pin in line with each other, and enable the tool to become displaced on or from the shaft, a latch 335 is provided. The said latch is pivoted at its inner end at 335 within a transverse open groove or slot 336 which is formed in the end of the shaft 33, and is acted upon by a spring 337 operating to project its engaging edge at the side of the shaft, and cause said edge to enter the groove 333 of the interior of the hub of the tool. So long as the latch occupies the groove 333 as in Figs. 39 and 40 the scouring tool is held thereby from turning relative to the shaft, and consequently it is held locked by the pin 332 from endwise movement on the tool shaft 33. Should, however, the latch 334 be pressed inward by hand so as to withdraw it from the groove 333 the scouring tool 331 may now be turned by hand relative to the shaft 33 and by bringing the groove 333 in apposition to the holding-pin 332 the tool will be free to be withdrawn from the tool shaft 33.

The blacking tool which is applied to the tool-carrier which contains the tool-shaft 34 is shown in detail in Figs. 26 and 27. The mounting for the said tool comprises in part the block 341 which is slipped upon the bearing 37 for the tool-shaft 34 and made fast thereon. To the said block is applied the arm 343 which carries the body 344 of the blacking tool. For the purpose of enabling the blacking tool to be shifted radially to suit different sizes of heels, the arm 343 is connected adjustably with the block 341. In the present instance, the portion of the block 341 to which the arm 343 is fitted is formed as a split clamp, between the members of which the arm 343 is arranged to slide radially. The said members are operated to clamp or release the arm by means of an operating screw 345, that is provided with an enlarged head for convenience in turning the same by hand. 346 is the mouth or discharge opening through which the blacking is delivered to the heel that is in position adjacent the said mouth or opening. Liquid blacking from a suitable source of supply is conveyed by a conducting pipe (not necessary to be shown) to the blacking tool, it being delivered into the passage 347 of the said tool. Compressed air from a suitable source of supply is delivered through a suitable conducting pipe (not necessary to be shown) into the interior of the blacking-tool at the inlet 348, and acts to force the blacking in the form of spray out through the mouth or discharge opening 346 onto the heel which is adjacent the said mouth or opening 346. For the purpose of adapting the effective length of the mouth or opening 346 to the height of the heel, the said mouth or opening is furnished with a cut-off 349, the said cut-off having combined therewith a screw 3491 by means of which the cut-off may be adjusted to close more or less of the length of the mouth or opening 346.

For the purpose of preventing discharge of the blacking at improper times, and waste thereof, a rotary valve 3441 is provided in connection with the interior passage of the blacking tool. This valve is furnished with means of operating the same automatically at the proper time, the said means comprising an arm 3442 fixed to the valve, and a slide-rod 3443 which is suitably mounted on the supporting-arm 343 and provided with a pin 3444 working in a slot in the arm 3442. As the tool-carrier on which the blacking tool is mounted rocks or swings, the enlarged heads or ends of the slide-rod 3443 make contact at the opposite extremes of the rocking or swinging movements with suitable fixed stops adjacent the end of the tool-carrier, and thereby relative endwise movement of the slide-rod upon the tool-carrier is occasioned and the valve is operated to open and close the passageway through the blacking tool at the proper times.

The burnishing wheel 351 which is applied to the shaft 35 is shown in Figs. 31, 32, and 33. The working surface of the said burnishing tool is constituted by a series of narrow raised lines or ridges which extend alternately in opposite directions, or zigzag, across the width of the face of the tool. The raised lines or ridges give each a narrow bearing against the surface of the heel which is being acted upon by the burnishing tool by which a better burnishing effect is secured. By causing the tool to take a narrow bearing against the surface of the heel, more pressure is brought to bear at the place at which the bearing occurs, which enables soft places and indentations to be perfectly finished. The narrow bearing also enables the tool to adapt itself to heels of varying curvatures which have been trimmed with the use of cutters of varying shapes. The zigzag arrangement of the lines or ridges causes the burnishing action to take effect across the entire width of the face of the tool.

We have shown in Figs. 36, 37 and 38 the beading tool which is applied to the shaft 36. The said tool is designated 352. It is mounted on a pin 353 at one end of an arm 354 the said arm having a spindle which is fitted within the case or shell 355 connected with the bracket 356, the latter being attached by means of the split clamp 357 to the bearing 37 of the shaft 36. The beading tool is driven from the tool-shaft 36 by means of a pinion 358 on said pin 353 and a gear 3557 fast on the tool-shaft 36. The spindle of the arm 354 is mounted within the said shell or case with capacity to turn slightly around the longitudinal axis of the said spindle so that the beading tool is permitted to swivel more or less and thereby adapt itself to the curvature of the heel-seat of the shoe which is being operated upon by the beading tool. The range or extent of the swiveling movement is limited by the notch at 3556 Fig. 34 in the upper end of the shell or case 355, and the pin 3546 projecting from the upper end of the spindle. The heel-key 3521 is mounted loosely on the pin 353 at the side of the heel-disk, and is free to turn in consequence of its contact with the surface of the work.

Figs. 31, 32 and 33 show a beading tool containing certain additional features of improvement, and illustrate our manner of applying the beading tool to the tool-carrier which supports the burnishing tool and operating both tools from the tool-shaft 35. In Figs. 31, 32 and 33 the burnishing tool is furnished with internal gear-teeth at 359 meshing with the teeth of the said pinion 358. Within the shell or case 355 is located the spring 3541 acting upon the spindle of the arm 354 with a tendency to hold the beading tool up to its work. The tension of the said spring may be adjusted by means of the adjusting screw 3542 so as to enable the depth of action of the beading tool and heel-key to be varied as desired by the operator. For hard stock increased pressure of the spring is required in order that the beading tool and heel key may act properly.

For convenience in giving access to the beading tool, heel-key, and pinion 358, as when it is required to remove or replace one thereof for any purpose, the sleeve or case 355 is hinged to the bracket 356 at 3551, so as to enable it to be swung from and toward the side of the burnishing tool in the line of the shaft 35. The pivotal portion or hub of the sleeve or case 355 is formed with two notches 3552 to receive the acting end of a spring-actuated bolt 3553 whereby the support of the beading tool, etc., is locked in its working position and in its upturned position, respectively, the said bolt being provided with a pin 3554 for convenience in operating the same manually to disengage its acting end from the pivotal portion or hub of the shell or case 355. A pin 3543 projects from the arm 354 through a slot 3555 in the shell or case 355 to prevent the arm and the parts carried thereby from turning out of position around the axis of the arm 354.

Having reference now to the details of the breasting cutter shown in Figs. 19 to 25, Sheet 10, for the purpose of supporting and adjusting the said cutter the stand 94 containing the bearings 92 93 for the slide or plunger 91 is fitted within a guide-way 941 on the machine-framing in which guide-way it is mounted to slide transversely with relation to its length. An adjusting-screw 942 which is mounted in a suitable bearing on the machine-framing at 943 engages by its screw-threaded portion with the stand 94. By means of the said adjusting-screw the stand 94 may be adjusted transversely so as to place the breasting cutter 90 in position suitable for the desired length of heel.

For the purpose of preventing the breasting-cutter from being driven too far into the work as it is advanced to trim the breast of a heel, the said cutter is mounted in the carrier 911 at the outer end of the slide or plunger 91, with capacity for independent movement longitudinally of the said slide or plunger. At the inner end of the shank of the breasting cutter a block 901 is mounted in the carrier 911 and is acted against by a spring 919 which tends to force the same outwardly in the direction of the length of the slide or plunger causing the said block to bear against the end of the shank of the breasting-cutter and operating to hold the latter projected beyond the end of the carrier 911. The side of the said block opposite the cutter is formed with a series of slots 902, 902, between which are projections 903, 903, extending lengthwise of the block. The said block is in line with the proximate end of the slide or plunger 91, which latter is formed with a corresponding series of longitudinal slots 912, 912, and intermediate projections 913, 913. The spring 919 is contained within chambers 918 and 904, respectively which are bored out in the slide or plunger 91 and block 901, respectively, and its opposite ends are connected with the slide or plunger and block, respectively, so as to enable the spring to act torsionally to partially turn or rotate the block 901 relative to the slide or plunger 91. The projections 903, 903 of the block 901, stand normally in line with the projections 918, 918, of the slide or plunger, and consequently when the slide or plunger is advanced it carries block 901 and cutter 90 with it, driving the said cutter into the material of the heel which is front of the same.

At 905 is a gage adapted to make contact with the shank of the shoe upon which the breasting cutter is acting. The body of the said gage is fitted to guides 906, 906, on the carrier 911, through which guides it is adapted to slide in the direction of the length of the slide or plunger. The said body of the gage is formed with a diagonal slot 907 receiving a pin 908 which projects radially from the block 901. The torsional force of the spring 919 acting to turn the block 901 into its normal position causes the pin 908 to bear against one of the inclined sides of the diagonal slot 907, and the pressure serves to advance the gage 905 the proper distance beyond the working end of the cutter 90, this distance being determined by the slot 907. When, during the advance of the slide or plunger 91 the gage 905 encounters the shank of the shoe it is arrested and held stationary, while the other parts continue to move. As the said movement continues, the travel of the pin 908 forward within the diagonal slot 907 causes the said slot to push the pin sidewise, rotating the block 901 until its slots 902, 902, are presented to the projections 913, 913, of the slide or plunger 91, whereupon the pressure of the slide or plunger 91 will no longer be transmitted to the block 901, and the advancing movement of the cutter will cease.

For the purpose of enabling the operator to correctly position the boot or shoe upon the work-carrier in jacking the same, we provide the gage-devices which are shown separately in Figs. 28, 29 and 30, Sheet 11. The said devices are omitted from Figs. 1 and 2 for the sake of clearness. They are supported upon the principal intermediate upright of the machine-framing at the right hand side of the work-carrier in Figs. 1 and 2. The supporting stand 501 for the gage-devices is bolted to the said upright, a portion of the said stand being represented in Fig. 1. A swivel-block 502 is applied to the said stand, it being connected with the stand by means of a pivot-pin 503, Fig. 28, fitting a socket or bearing within the stand, thus permitting the swivel-block 502 to rock or turn in a vertical plane. A supporting-arm 504 is connected with the swivel-block by means of a vertical pivot 505 on which the arm is free to turn in a horizontal plane relative to the swivel-block, the said supporting-arm having the end which is connected with said swivel-block forked, and the forks fitting above and below the swivel-block. The pivot-pin 505 is fitted to holes in the said forks. A block or plunger 506 contained within a chamber 507 of the supporting-arm is acted upon by a spring 508, also contained within the said chamber, and tending to push the said block or plunger outwardly. The head of the block or plunger bears against a portion 509 of the stand, and if the spring is permitted to act to move the arm it forces the arm outwardly. The arm is locked in the inner position thereof, which corresponds with the working position of the gages, by means of a bolt or locking-pin 510 moving within a guide chamber 511 with which the stand is provided, and acted upon by a spring 512 also contained within the said chamber, the said spring operating to hold the outer end of the locking-bolt within a notch in the edge of one of the forks on the gage-supporting arm 504. When the supporting arm 504 is moved into the position which places the gages in proper position for use in jacking a boot or shoe, the head of the locking-bolt enters the notch of the said arm and thereby the supporting-arm and its gages are locked in place.

For the purpose of releasing the arm so as to permit the arm and its gages to be swung outward away from the shoe after the latter has been jacked, the bolt is retracted by the operator, as through means of a bell-crank 513 connected therewith and also joined by a suitable connecting link 514 with the treadle 184 by means of which the operating mechanism for the work-carrier is shipped into action. Thus, when the said treadle 184 is moved by the operator to bring the said mechanism into action for the purpose of occasioning an advance of the work-carrier, the locking-bolt 510 is retracted so as to release the supporting-arm 504 and permit the spring 508 to operate to move the arm and gages away from the boot or shoe which has just been jacked. The purpose of hanging the swivel-block to the supporting-stand 501 with capacity to swing vertically is in order that in case the gages should not clear the heel of the boot or shoe which has just been jacked, the gages and their supporting arm may rise with the said heel as the work-carrier is advanced, and thereby breakage or injury may be avoided.

The supporting arm is provided with a split clamp 515 receiving the horizontally extending rod 517 extending from the gagehead, the said clamp having a screw 516 by means of which it may be tightened upon the said rod after the latter has been adjusted lengthwise so as to place the gages in proper position.

The gage-head 518 is provided with a point 519 which is intended to make contact with the center of the heel-seat of the boot or shoe which is being jacked, and with opposite points 520, 520, which are intended to act against the said heel-seat at the opposite sides of the boot or shoe. The centergage 519 is mounted within a socket 521 forming part of the gage-head and provided with an adjusting screw 522 by means of which the center-gage may be adjusted in the direction of its length, according to the length which the heel is to have after it has been acted upon by the breasting-cutter. A clamping screw 523 serves to hold the center-gage in the position of adjustment which has been given to the same. The side-gages 520, 520, are carried by opposite levers 524, 524, which are pivoted upon the gage-head and connected with each other, as, for instance, by intermeshing toothed segments, see Fig. 30, so as to move in unison and equally. A right-and-left screw 525 is provided in connection with the short arms of these levers, for the purpose of enabling the spread of the gage-carrying arms to be varied to suit the widths of the heel-seats of the different sizes of shoes which it is desired to operate upon in the machine. The side-gages are fitted to sockets 526, 526, on the said levers and are clamped in position in the said sockets by screws 527, 527. As will be perceived, the gaging devices are mounted in position intermediate the breasting-cutter and the trimming cutter so as to enable the same to be utilized in connection with a work-support or jack on the work-carrier which is located intermediate the said tools.

A boot or shoe having been applied to the last or form pertaining to the said work-support or jack and the gages being in position for use, the operator pulls the boot or shoe toward himself so that the heel-seat assumes a position within the opening which is inclosed by the three gage-points. By manipulation of the clamping-arm 15 effected by turning the adjusting-screw 27, the shoe is adjusted lengthwise of the machine until the heel-seat has been caused to touch properly the three gage-points. The heel of the boot or shoe then is in proper position to be carried by the movements of the work-carrier past the successive tools and subjected to the action thereof. The side-gages are respectively adjustable to enable them to be set to accommodate heels which have been placed upon the shoes a little bit to one side or the other.

Sometimes it will be found that shoes for some reason have had the top lifts of their heels applied to the same a little out of true to one side or the other, this resulting perhaps through some peculiarity of action of the machine by which the toplifts are spanked on. If it be desired to trim the heels to suit the positions of the toplifts, this is enabled to be accomplished by proper adjustment of the side-points of the gage. Again, should it be desired not to trim by the toplift, which is objectionable inasmuch as when the toplift is somewhat misplaced the trimmed heel is somewhat out of symmetrical position, but to trim so as to secure a symmetrical position of the heel, this is provided for also by a proper adjustment of the side-points.

The lateral curvature at 206, Fig. 11, Sheet 9, of each movable clamping arm 15 of the work-carrier, produces a bend in the said arm extending to one side around the path of the breasting-cutter when such arm is in the position in which the work connected therewith is presented for action to the breasting-cutter. This enables the said breasting-cutter to act against the work in the same radial line with the plate or block 16 which is carried by the said arm. This bend is open at the rear side, which is highly advantageous inasmuch as it enables the work-carrier to be rotated in a direction to carry the arm 15 away from the breasting-cutter when the latter is in an advanced position. This avoids injury or breakage due to engagement of the arm with the breasting-cutter in consequence of such rotary movement of the work-carrier, and enables the rotation of the work-carrier to be begun at an earlier instant.

We do not lay claim herein to the blacking tool, inasmuch as it is the sole invention of Eugene H. Taylor.

We claim as our invention:—

1. In a machine for finishing the heels of boots and shoes, in combination, a series of tools, means to actuate the said tools, a work-carrier for supporting a plurality of boots or shoes and presenting the same to the action of the tools, power-actuated shifting-devices for causing each boot or shoe to be subjected to the respective stages of the operations, successively, and manual controlling devices for the said power-actuated shifting-devices.

2. In a machine for finishing the heels of boots and shoes, in combination, a series of tools means to actuate the said tools, a work-carrier for supporting a plurality of boots or shoes and presenting the same to the action of the tools, power-actuated devices for causing each boot or shoe to be subjected to the respective stages of the operations, successively, and also for clearing the boots or shoes and the tools from each other during the shift, and manual controlling devices for the said power-actuated devices.

3. In combination, a series of tools, means to actuate the said tools, a work-carrier for supporting a plurality of boots or shoes and presenting the same to the action of the tools, power-actuated shifting-devices for actuating the said work-carrier to shift the respective boots or shoes from one stage to the next, normally inoperative to effect the said shift, and manual controlling devices whereby at the will of the operator the said power-actuated shifting-devices may be rendered operative to produce said shift.

4. In combination, a series of tools means to actuate the said tools, a work-carrier for supporting a plurality of boots or shoes and presenting the same to the action of the tools, power-actuated devices for actuating the said work-carrier to shift the respective boots or shoes from one stage to the next, and for retracting the same to cause the said boots or shoes to clear the tools during the shift, and manual controlling devices whereby at the will of the operator the said power-actuated devices may be rendered operative to occasion said working.

5. In combination, a series of tools means to actuate the said tools, a work-carrier for supporting a plurality of boots or shoes and presenting the same to the action of the tools, power-actuated shifting-devices for actuating the said work-carrier to shift the respective boots or shoes from one stage to the next, normally inoperative to occasion said shift, and manually-controlled shipper-devices in connection with the said shifting-devices whereby the latter are made operative at the will of the operator.

6. In combination, a series of tools means to actuate the said tools, a work-carrier for supporting a plurality of boots or shoes and presenting the same to the action of the tools, power-actuated devices for actuating the said work-carrier to shift the respective boots or shoes from one stage to the next, and also to retract the boots or shoes so as to clear the tools during such shift, and manually-controlled shipper-devices whereby the said power-actuated devices may be rendered operative at the will of the operator to actuate the work-carrier.

7. In combination, a series of tools, means to actuate the said tools, a work-carrier for supporting a plurality of boots or shoes and presenting the same to the action of the tools, means for actuating the said work-carrier to shift the respective boots or shoes from one stage to the next, said means including a power-driven actuator and a clutch and manually-controlled shipper-devices whereby at the will of the operator the said clutch may be rendered operative to transmit power to actuate the work-carrier.

8. In combination, a series of tools, means to actuate the said tools, a work-carrier for supporting a plurality of boots or shoes and presenting the same to the action of the tools, means for actuating the said work-carrier to shift the respective boots or shoes from one stage to the next, and also to retract the boots or shoes so as to clear the tools during such shift, said means including a power-driven actuator and a clutch, and manually-controlled shipper-devices whereby at the will of the operator the said means may be rendered operative to actuate the work-carrier.

9. In combination, the series of tools, means to actuate the said tools, the work-carrier for supporting a plurality of boots or shoes and presenting the same to the action of the tools, and power-driven devices embracing means for communicating a partial onward movement to the said work-carrier to shift the respective boots or shoes from one stage to the next, and means operatively connected with said work-carrier to move the same axially to cause the boots or shoes to clear the tools during the said shift.

10. In combination, the series of tools, means to actuate the said tools, the work-carrier for supporting a plurality of boots or shoes and presenting the same to the action of the tools, and power-driven devices embracing means for communicating a partial onward movement to said work-carrier to shift the respective boots or shoes from one stage to the next and a cam which is operatively connected with said work-carrier to move the same axially to cause the boots or shoes to clear the tools during the said shift.

11. In combination, the series of tools, means to actuate the said tools, the work-carrier for supporting a plurality of boots or shoes and presenting the same to the action of the tools, power-driven devices embracing means for communicating a partial onward movement to said work-carrier to shift the respective boots or shoes from one stage to the next and a cam which is operatively connected with said work-carrier to move the same axially to cause the boots or shoes to clear the tools during the said shift, and manual controlling devices whereby at the will of the operator, the said power-driven devices may be caused to actuate the work-carrier.

12. In combination, the series of tools, means to actuate the said tools, the work-carrier for supporting a plurality of boots or shoes and presenting the same to the action of the tools, an actuating shaft, means connected therewith for transmitting a movement of partial rotation to said work-carrier, a cam and connections therefrom to move said work-carrier axially, power-driving connections for said shaft, and manual controlling devices for the driving-power.

13. In combination, a support for a boot or shoe, an edge-finishing tool, a shaft and means for driving the same, traverse mechanism actuated by the said shaft producing relative traverse between the said tool and the said boot or shoe around the latter, and a controller-cam, operatively connected with said shaft to turn in fixed relation therewith, and operatively connected with said driving means to keep the latter in driving relations with the said shaft until the completion of the traverse and then permit such relations to terminate.

14. In combination, supports for a plurality of boots or shoes, a series of edge-finishing tools, a shaft and means for driving the same, traverse mechanism actuated by the said shaft producing relative traverse between the respective tools and the corresponding boots or shoes around the latter, and a controller-cam, operatively connected with said shaft to turn in fixed relation therewith, and operatively connected with said driving means to keep the latter in driving relations with the said shaft until the completion of the traverse and then permit such relations to terminate.

15. In combination, supports for a plurality of boots or shoes, an edge-finishing tool, mechanism for producing relative traverse between the said tool and the corresponding boot or shoe around the latter, a breasting-cutter, a shaft constituting an actuator in common for said traverse-mechanism and said breasting-cutter and by which the traverse and the working movement of the said breasting-cutter are produced with proper correspondence in time, driving connections for said shaft, and a controller-cam operated by said shaft and governing the driving of the shaft by the said driving connections.

16. In combination, supports for a plurality of boots or shoes, a series of edge-finishing tools, mechanism for traversing the respective tools around the boots or shoes, a breasting cutter, a shaft constituting an actuator in common for said traverse-mechanism and said breasting cutter and by which the traverses of said edge-finishing tools and the working movement of said breasting-cutter are produced with proper correspondence in time, driving connections for said shaft, and a controller-cam operated by said shaft and governing the driving of the shaft by the said driving connections.

17. In combination, supports for a plurality of boots or shoes, a series of finishing tools, traversing carriers for the respective tools, an operating shaft, means to transmit traversing movements to the said carriers from said shaft, driving connections for said shaft, shipping-devices for said driving connections, and the controller-cam operated by the said shaft and governing the action of said shipping-devices to keep the said driving-connections in driving relations with the shaft until the completion of the traverse and then release the same.

18. In combination, a support for a boot or shoe, a finishing tool, a swinging carrier for one of said parts, having a toothed surface in connection therewith, a rack in operative engagement with the said toothed surface, an operating shaft, means to operate the rack from said shaft, driving connections for the shaft, shipping-devices for the said driving connections, and the controller-cam governing the action of the said shipping-devices.

19. In combination, a series of supports for a plurality of boots or shoes, a series of finishing tools, swinging carriers for the parts of one of the said series having toothed surfaces in connection therewith, a rack in operative engagement with the said toothed surface, an operating shaft, means to operate the rack from said shaft, driving connections for the shaft, shipping-devices for the said driving-connections, and the controller-cam governing the action of the said shipping-devices.

20. In combination, supports for a plurality of boots or shoes, a series of finishing tools, swinging carriers for the respective tools, each carrier having a toothed surface in connection therewith, the curved rack in operative engagement with the said toothed surfaces, the operating shaft, means to operate said rack from said shaft, driving connections for the shaft, shipping-devices for said driving connections, and the controller-cam governing the action of the said shipping-devices.

21. In combination, a series of supports for boots or shoes, a series of finishing tools, a support for one of said series movable to shift the latter, stage by stage, relative to the other series, swinging carriers for the parts of one of the said series, each carrier having a toothed surface in connection therewith, a rack in operative engagement with the said toothed surfaces, an operating shaft, means to operate said rack from said shaft, driving connections for the said shaft, shipper-devices for said connections, and a controller-cam governing the action of the said shipper-devices.

22. In combination, supports for a plurality of boots or shoes, a series of finishing tools, swinging carriers for the respective tools, each carrier having a toothed surface in connection therewith, the curved rack in operative engagement with the said toothed surfaces, the operating shaft, means to operate said curved rack from said shaft, driving connections for the said shaft embracing a clutch, a shipper for said clutch, and the controller-cam in control of said shipper.

23. In combination, a series of supports for boots or shoes; a series of finishing tools, a rotatable support for one of said series, movable step by step, swinging carriers for the parts of one of the said series, each carrier having a toothed surface in connection therewith, a curved rack in operative engagement with the said toothed surfaces, an operating shaft, means to operate the said rack from the said shaft, driving connections for the said shaft, shipper-devices for said connections, and a controller-cam governing the action of the said shipper-devices.

24. In combination, a support for a boot or shoe, a finishing tool, a swinging carrier for one of the said parts, a breasting-cutter, a shaft operatively connected with said carrier and with said breasting-cutter and constituting an actuator in common therefor whereby the traverse of the finishing-tool and the action of the breasting-cutter are produced with proper correspondence in time, driving connections for said shaft embracing a clutch and a shipper for said clutch, and a controller-cam mounted on said shaft and operatively connected with the said shipper to hold the clutch closed until the completion of the traverses of the finishing-tool and the operation of the breasting-cutter and then release the same.

25. In combination, supports for a plurality of boots or shoes, a series of finishing-tools, swinging carriers for the respective tools, a breasting-cutter, a shaft operatively connected with said carriers and with said breasting-cutter and constituting an actuator in common whereby the traverses of the finishing-tools and the action of the breasting-cutter are produced with proper correspondence in time, driving connections for said shaft embracing a clutch and a shipper for said clutch, and a controller-cam mounted on said shaft and operatively connected with the said shipper to hold the clutch closed until the completion of the traverses of the finishing-tools and the operation of the breasting-cutter and then release the same.

26. In combination, a series of supports for boots or shoes, a series of finishing-tools, a support for one of said series, movable step by step, swinging carriers for the parts of one of the said series, a breasting-cutter, a shaft operatively connected with said carriers and with said breasting-cutter and constituting an actuator in common whereby the swinging movements of the carriers and the action of the breasting-cutter are produced with proper correspondence in time, driving connections for said shaft embracing a clutch and a shipper for said clutch, and a controller-cam mounted on said shaft and operatively connected with the said shipper to hold the clutch closed until the completion of the said swinging movements and the operation of the breasting-cutter and then release the same.

27. In combination, a series of tools, traversing carriers for the respective tools, an operating shaft, means for operating said carriers from said shaft, driving connections for said shaft, a shipper operable by the operator, the controller-cam for said shipper operatively connected with said shaft, a work-carrier for supporting a plurality of boots or shoes and presenting the same to the action of the tools, power-actuated shifting-devices for actuating the said work-carrier to shift the respective boots or shoes from one stage to the next, and manual controlling devices whereby at the will of the operator the said power-actuated shifting-devices may be rendered operative to produce said shift between the traversing movements of the carriers.

28. In combination, a series of tools, swinging carriers for the respective tools, an operating shaft, means for operating said carriers from said shaft, driving connections for said shaft, a shipper operable by the operator, the controller-cam operatively connected with said shaft, a work-carrier for supporting a plurality of boots or shoes and presenting the same to the action of the tools, power-actuated devices for actuating the said work-carrier to shift the respective boots or shoes from one stage to the next and for retracting the same to cause the said boots or shoes to clear the tools during the shift, and manual controlling devices whereby at the will of the operator the said power-actuated devices may be rendered operative to occasion said working between the traversing movements of the carriers.

29. In combination, supports for a plurality of boots or shoes, a series of finishing tools, swinging carriers for the respective tools, each of said carriers having in connection therewith a toothed surface, an operating toothed surface in engagement with the toothed surfaces of the respective swinging carriers, the rack and pinion for actuating the said operating toothed surface, and means to reciprocate said rack.

30. In combination, supports for a plurality of boots or shoes, a series of finishing tools, swinging carriers for the respective tools, each of said carriers having in connection therewith a toothed surface, the curved rack in operative engagement with the series of toothed surfaces, and means to impart to-and-fro movement to the said curved rack.

31. In combination, supports for a plurality of boots or shoes, a series of finishing tools, swinging carriers for the respective tools, each of said carriers having in connection therewith a toothed surface, the curved rack in operative engagement with the said toothed surfaces, the actuating rack and pinion for operating the said curved rack, the operating shaft, and the cam operating the said actuating rack.

32. In combination, supports for a plurality of boots or shoes, a series of finishing tools, swinging carriers for the respective tools, each of said carriers having in operative connection therewith a toothed surface, the rack in operative engagement with said toothed surfaces, means to reciprocate said rack, and means to vary the length of the reciprocations of the rack.

33. In combination, supports for a plurality of boots or shoes, a series of finishing tools, swinging carriers for the respective tools, each of said carriers having in operative connection therewith a toothed surface, the rack in operative engagement with said toothed surfaces, an operating shaft and means to transmit movement from said shaft to said rack having provisions to permit an adjustable amount of play or lost-motion to enable the extent of the swinging movements of the carriers to be varied as required.

34. In combination, supports for a plurality of boots or shoes, a series of finishing tools, swinging carriers for the respective tools, each carrier having a toothed surface in operative connection therewith, the rack in operative engagement with said toothed surfaces, an operating shaft, a second rack actuated therefrom and in operative connection with the rack first mentioned, and means to vary the extent of the movements which are communicated to the said second rack and thus adjust the lengths of the traverses of the swinging carriers.

35. In combination, supports for a plurality of boots or shoes, a series of finishing tools, swinging carriers for the respective tools, each carrier having a toothed surface in operative connection therewith, the rack in operative engagement with said toothed surfaces, an operating shaft, a second rack in operative connection with the rack first mentioned, operative connections whereby said second rack is actuated from said shaft, and means to permit an adjustable amount of lost motion to enable the extent of the traverses of the carriers to be varied as required.

36. In combination, supports for a plurality of boots or shoes, a series of finishing tools, movable carriers for the respective tools, an actuator of constant throw, and means to transmit traversing movements to said carriers from said actuator, said means having provisions for permitting an adjustable amount of lost motion to enable the extent of the traverse to be varied as desired.

37. In combination, a finishing tool, a swinging carrier for the same, a pinion and means to transmit traversing movements from said pinion to said carrier, a rack, an operating shaft, and connections for operating said rack from said shaft, the said connections having provisions to permit an adjustable amount of lost motion to enable the extent of the traverse of the carrier to be varied as required.

38. In combination, supports for a plurality of boots or shoes, a series of finishing tools, movable carriers for the respective tools, an operating shaft, means to operate said carriers from said shaft to occasion the required traversing movements thereof, driving connections for said shaft, shipping devices acting to suspend the driving of said shaft when the predetermined traversing movement of the carriers is completed, the controller-cam operatively connected with said shaft and governing the action of said shipping-devices, and manually-operated connections whereby said shipping-devices may be actuated to throw the said shaft into operation at the will of the operator.

39. In combination, supports for a plurality of boots or shoes, a series of finishing tools, movable carriers for the respective tools, a breasting-cutter, an operating-shaft in operative connection with said carriers and breasting-cutter and constituting an actuator in common for the said devices whereby the traverses of the finishing tools and the action of the cutter are occasioned with the proper correspondence in time, driving-connections for said shaft, shipping devices acting to suspend the driving of said shaft when the predetermined traverse of the carriers is completed and the breasting cutter has acted, the controller-cam operatively connected with said shaft and governing the action of said shipping-devices, and manually-operated connections whereby said shipping-devices may be actuated to throw the said shaft into operation at the will of the operator.

40. In combination, supports for a plurality of boots or shoes, a series of finishing tools, movable carriers for the respective tools, an operating shaft, means to operate said carriers from said shaft to occasion the required traversing movements thereof, driving means for said shaft, shipper-devices in connection with such driving means, the controller-cam in operative connection with such shipper-devices operating to hold the driving-power on until the completion of the traverses of the finishing tools, and the safety-release whereby at the will of the operator the said shipper-devices may be released to permit the driving of the shaft to be arrested.

41. In combination, supports for a plurality of boots or shoes, a series of finishing tools, movable carriers for the respective tools, means for traversing said carriers and the tools supported thereby, a breasting-cutter, an operating shaft in operative connection with said carriers and breasting-cutter and constituting an actuator in common for said devices whereby the traverses of the finishing tools and the action of the breasting-cutter are occasioned with the proper correspondence in time, driving means for said shaft, shipper-devices in connection with said driving means, the controller-cam in operative connection with such shipper-devices and by which the driving-power is held on until the completion of the traverses of the finishing tools, and the safety-release whereby at the will of the operator the said shipper-devices may be released to permit the driving of the shaft to be arrested.

42. In combination, supports for a plurality of boots or shoes, a series of finishing tools, movable carriers for the respective tools, an operating shaft, means to transmit traversing movements to said carriers from said shaft, the controller-cam, driving means for said shaft, the shipper, the movable part or member engaging with said controller-cams the said cam through its action against the said part or member operating to hold the driving-power on until the completion of the traverses of the finishing-tools and to release the said part or member on the return of the carriers to starting position, the latch connecting said movable part or member with the shipper—and means to enable the disengagement of said latch to release the shipper to be effected manually.

43. In a machine for finishing the heels of boots or shoes, in combination, supports for a plurality of boots or shoes, a shaft, a series of tools carriers for said tools, means for transmitting traversing movement to said carriers from said shaft, the controller-cam, driving means for said shaft, the shipper, the movable part or member engaging with said controller-cam the said cam through its action against the said part or member operating to hold the driving-power on until the completion of the traverses of the finishing-tools and to release the said part or member on the return of the carriers to starting position, the latch connecting said movable part or member with the shipper, and means to enable the disengagement of said latch to release the shipper to be effected manually and also to apply a brake to hold said shaft from rotation.

44. In combination, a series of tools, movable carriers therefor, a shaft, means for transmitting traversing movements to said carriers from said shaft, driving means for said shaft embracing a clutch, the shipper, and the controlling cam operatively combined with said shaft and shipper and acting to hold said clutch closed until the end of the required traversing movement of the carriers and then release the same.

45. In combination, a support for a boot or shoe, a finishing tool, a tool-shaft, bearings receiving opposite end-portions of said tool-shaft, a rocking carrier having guides at the front and rear ends thereof with said bearings applied thereto, means to rock said carrier, means to rotate said tool-shaft, and a pattern coöperating with the outer bearing to determine the path followed by the tool.

46. In combination, a support for a boot or shoe, a finishing tool, a tool-shaft, bearings receiving opposite portions of said tool-shaft, a rocking carrier having said bearings applied thereto, means to rock said carrier, means to rotate said tool-shaft, means to adjust the inner bearing radially of said carrier, and a pattern coöperating with the outer bearing to determine the path followed by the tool.

47. In combination, a finishing tool, a tool-shaft, a rocking tool-carrier having radially slotted arms at its opposite ends, bearings for said tool-shaft fitted within the slots of said arms, a pattern coöperating with the bearing next adjacent the tool to determine the path followed by said tool, slides at opposite sides of the other bearing, the latter bearing having pins extending oppositely therefrom and engaging with said slides, the cross-head engaging with said slides, and means for adjusting the said cross-head radially.

48. In combination, a finishing tool, a tool-shaft, a rocking tool-carrier having radially slotted arms at its opposite ends, bearings for said tool-shaft fitted within the slots of said arms, a pattern coöperating with the bearing next adjacent the tool to determine the path followed by said tool, slides at opposite sides of the other bearing, the latter having pins extending oppositely therefrom through said slides and working in longitudinal slots in the opposite side-portions of the corresponding slotted arm of the tool-carrier, the cross-head engaging with said slides, and means for adjusting the said cross-head radially.

49. In combination, a support for a boot or shoe, a finishing tool, a tool-shaft, a rocking tool-carrier, means to rock the said tool-carrier, a pattern to determine the path followed by the tool, a follower engaging with said pattern and operatively connected with said tool-shaft, and means to effect relative radial adjustment between the tool-shaft and the follower to shift the path of the tool to suit variations in the size of the work.

50. In combination, a support for a boot or shoe, a finishing tool, a tool-shaft, a rocking carrier provided with bearings receiving the said tool-shaft, means to rock the said carrier, a pattern to determine the path followed by the tool, a follower connected with one of the said bearings and engaging with the said pattern, and means to effect relative radial adjustment between the said bearing and the follower to shift the path of the tool to suit variations in the size of the work.

51. In combination, a support for a boot or shoe, a finishing tool, a tool-shaft, a rocking carrier provided with bearings, receiving the said tool-shaft, means to rock the said carrier, a pattern to determine the path followed by the tool, a follower engaging with the said pattern, and a radial adjusting screw between the said follower and one of said bearings.

52. In combination, a support for a boot or shoe, a rocking tool-carrier, a substantially radial guide carried by the said tool-carrier, a tool-mounting applied to said guide, a pattern serving to determine the general path of the tool during the rocking movement of said tool-carrier, and means to adjust the angle of said guide relative to the length of the axis of the tool-carrier to impart to the tool a predetermined amount of lengthwise movement.

53. In combination, a support for a boot or shoe, a rocking tool-carrier, a substantially radial guide carried by the said tool-carrier, a tool-shaft bearing applied to said guide, a tool-shaft, a pattern serving to determine the general path of the tool during the rocking movement of said tool-carrier, and means to adjust the angle of said guide relative to the length of the axis of the tool-carrier.

54. In combination, a support for a boot or shoe, a finishing tool, a tool-shaft, a rocking-carrier provided with a radial guide, a bearing for said tool shaft having radially-sliding engagement with said carrier and controlled thereby as to its relative movement longitudinally of the tool-shaft and a pattern whereby the path followed by the tool in traversing around the work is determined.

55. In combination, a support for a boot or shoe, a finishing tool, a tool-shaft, a rocking carrier having a radial guide hung or pivoted to enable it to swivel lengthwise of the tool-shaft, a bearing for said tool-shaft having radially-sliding engagement with said guide and controlled thereby as to its relative movement longitudinally of the tool-shaft and a pattern whereby the path followed by the tool in traversing around the work is determined.

56. In combination, a support for a boot or shoe, a pattern, a finishing tool, a tool-shaft, a tool-carrier provided with radial guide-ways, means to turn said tool-carrier around the work, a tool-shaft bearing applied to one of the said guideways and controlled thereby as to movement longitudinally of the tool-shaft, the said bearing operatively engaging with the said pattern in the movement of said tool-carrier, whereby said bearing is caused to move radially, a second tool-shaft bearing applied to a second guideway of said tool-carrier, a mounting to which said second bearing is swiveled, and means to adjust the said mounting radially of said second guideway.

57. In combination, a support for a boot or shoe, a pattern, a finishing tool, a tool-shaft, a tool-carrier provided with radial guideways, one of them swiveled upon the tool-carrier and adapted to turn on its pivotal support in the direction of the length of the tool-shaft, means to turn said tool-carrier around the work, a tool-shaft bearing applied to the said swiveled guideway and controlled thereby as to movement longitudinally of the tool-shaft, the said bearing operatively engaging with the said pattern in the movement of said tool-carrier, whereby said bearing is caused to move radially, a second tool-shaft bearing, applied to a second guideway of said tool-carrier, a mounting to which said second bearing is swiveled, and means to adjust the said mounting radially of said second guideway.

58. In combination, a finishing tool, a traveling work-support by which a boot or shoe after being jacked is carried into position to be acted upon by said tool, and a jacking-gage, located at the jacking point in the machine, for properly positioning the boot or shoe upon the work-support prior to being carried to the said tool by the movement of the work-support.

59. In combination, a finishing tool, a traveling work-support by which a boot or shoe after being jacked is carried into position to be acted upon by the said tool, a jacking-gage, located at the jacking point in the machine, for properly positioning the boot or shoe upon the work-support prior to being carried to the said tool by the movement of the work-support, and a gage-support movable to place said jacking-gage in working position and to enable it to be retracted from the boot or shoe which has been jacked.

60. In combination, a finishing tool, a traveling work-support by which a boot or shoe after being jacked is carried into position to be acted upon by the said tool, a jacking-gage, located at the jacking point in the machine, for properly positioning the boot or shoe upon the work-support prior to being carried to the said tool by the movement of the work-support, a gage-support movable to place said jacking-gage in working position and to enable it to be retracted from the boot or shoe which has been jacked, and a latching device whereby to hold the said jacking-gage in said working position during the jacking operation.

61. In combination, a finishing tool, a work-carrier by which a boot or shoe after being jacked is carried into position to be acted upon by the said tool, a jacking gage located at the jacking point in the machine for properly positioning the boot or shoe upon the work-carrier prior to being carried to the said tool by an advance of the work-carrier, a gage-support movable to place said jacking-gage in and out of working position, a latch to hold the jacking-gage temporarily in working position, and means to operate said work-carrier at the will of the operator, said means having connections whereby said latch is disengaged to free the jacking-gage when the work-carrier is to be advanced.

62. In combination, a finishing tool, a traveling work-support by which a boot or shoe after being jacked is carried into position to be acted upon by the said tool, a jacking gage having its normal working position located at the jacking point for properly positioning the boot or shoe upon the work-support prior to being carried to the said tool by the movement of the work-support, and an independent gage-support movable to enable the jacking-gage to partake of the movement of the boot or shoe toward the tool.

63. In combination, a finishing tool, a traveling work-support by which a boot or shoe after being jacked is carried into position to be acted upon by the said tool, a jacking-gage having its normal working position located at the jacking point for properly positioning the boot or shoe upon the work-support prior to being carried to the said tool by the movement of the work-support, and an independent gage-support movable to place said jacking-gage in working position and to enable it to be retracted from the boot or shoe which has been jacked, and also movable to enable the jacking-gage to partake of the movement of the boot or shoe toward the tool.

64. In combination, a finishing tool, a movable work-support by which a boot or shoe after being jacked is carried into position to be acted upon by the said tool, and a jacking-gage comprising essentially a supporting-block swiveled to enable the gage to advance in unison with the work-support toward said tool, an arm movably connected to said swiveling-block and thereby adapted to be swung into and out of working relations, and gages carried by the said arm.

65. In combination, a finishing tool, a movable work-support by which a boot or shoe after being jacked is carried into position to be acted upon by the said tool, a jacking-gage comprising essentially a supporting-block swiveled to enable the gage to advance in unison with the work-support toward said tool, an arm movably connected to said swiveling-block and thereby adapted to be swung into and out of working relations, and gages carried by the said arm, a latch to retain said arm in said working relations, and a spring acting to move said arm out of said working relations when said latch is disengaged.

66. In combination, a finishing tool, a movable work-support by which a boot or shoe after being jacked is carried into position to be acted upon by the said tool, a jacking-gage comprising essentially a supporting-block swiveled to enable the gage to advance in unison with the work-support toward said tool, an arm movably connected to said swiveling-block and thereby adapted to be swung into and out of working relations and gages carried by the said arm, a latch to retain said arm in said working relations, a spring acting to move said arm out of said working relations when said latch is disengaged, means to advance said work-support, and connections from said means whereby the latch is disengaged to free the jacking-gage when the work-support is to be advanced.

In testimony whereof we affix our signatures, in presence of two witnesses.

WARREN C. EVANS.
EUGENE H. TAYLOR.

Witnesses:
CHAS. F. RANDALL,
EDITH J. ANDERSON.